(12) United States Patent
Gorectke et al.

(10) Patent No.: US 12,557,041 B2
(45) Date of Patent: Feb. 17, 2026

(54) CONTROLLING NETWORK PARTICIPANTS TO SELECT RADIO POWER LEVELS THAT BEST SERVE THE NETWORK AND INDIVIDUAL PARTICIPANTS

(71) Applicant: Quixotic Holdings, LLC, Lakeland, FL (US)

(72) Inventors: Charles Robert Gorectke, Lakeland, FL (US); Ryan Scott Luther, Lakeland, FL (US); Anthony Samuel Jacobs, Olney, MD (US)

(73) Assignee: QUIXOTIC HOLDINGS, LLC, Lakeland, FL (US)

( * ) Notice: Subject to any disclaimer, the term of this patent is extended or adjusted under 35 U.S.C. 154(b) by 485 days.

(21) Appl. No.: 17/899,214

(22) Filed: Aug. 30, 2022

(65) Prior Publication Data

US 2023/0077097 A1     Mar. 9, 2023

Related U.S. Application Data

(60) Provisional application No. 63/239,254, filed on Aug. 31, 2021.

(51) Int. Cl.
| | |
|---|---|
| *H04W 52/38* | (2009.01) |
| *G01B 21/04* | (2006.01) |
| *H04W 40/10* | (2009.01) |
| *H04W 52/00* | (2009.01) |
| *H04W 52/28* | (2009.01) |

(52) U.S. Cl.
CPC ......... *H04W 52/383* (2013.01); *H04W 40/10* (2013.01); *H04W 52/283* (2013.01)

(58) Field of Classification Search
None
See application file for complete search history.

(56) References Cited

U.S. PATENT DOCUMENTS

| | | | | |
|---|---|---|---|---|
| 8,838,122 | B2* | 9/2014 | Stamoulis | H04W 24/02 455/452.1 |
| 8,838,135 | B2* | 9/2014 | Moshfeghi | G01S 5/0009 455/456.1 |
| 10,178,509 | B1 | 1/2019 | Perdew et al. | |
| 2007/0242647 | A1* | 10/2007 | Bennett | H04W 88/04 370/338 |
| 2008/0056201 | A1* | 3/2008 | Bennett | H04W 36/304 455/562.1 |
| 2014/0237123 | A1* | 8/2014 | Dave | H04M 19/04 709/227 |

(Continued)

FOREIGN PATENT DOCUMENTS

DE     102007053330 A1 *  6/2009  .......... G01B 21/047

*Primary Examiner* — Pablo N Tran
(74) *Attorney, Agent, or Firm* — Seed Intellectual Property Law Group LLP

(57) ABSTRACT

A facility that controls participants in an ad hoc peer wireless network to use transmission power level settings and routing paths that best serve individual participants in the network and the network as a whole is described. Variously, the facility modulates transmission power levels to extend participant battery life and reduce the likelihood of radio interference in the network; establishes routing paths that contribute to the effectiveness and continuing operation of the network; and monitors for and responds to the occurrence of interference in the network's communications.

15 Claims, 13 Drawing Sheets

(56) References Cited

U.S. PATENT DOCUMENTS

| | | |
|---|---|---|
| 2020/0344217 A1 | 10/2020 | Luther et al. |
| 2023/0034421 A1* | 2/2023 | Zhang .................. H04L 5/16 |
| 2024/0147387 A1* | 5/2024 | Wilhelmsson ...... H04W 52/367 |

* cited by examiner

| Individual Participant Information | | | | | Other Participants that are within Line-of-Sight | | | | | | |
|---|---|---|---|---|---|---|---|---|---|---|---|
| Participant Identifier | Kinematics | Spectrum Capabilities | Timestamp | Routing Score | Line-of-sight Participant Identifier | Quality of Signal | Frequency Capability | Spectrum Capability | Routing Score | Signal to Noise Ratio | Weighted Value Between Pair |
| C | | | | | A | | | | | | |
| | | | | | B | | | | | | |
| E | | | | | F | | | | | | |
| | | | | | G | | | | | | |

FIG. 3

CONTROLLING NETWORK PARTICIPANTS TO SELECT RADIO POWER LEVELS THAT BEST SERVE THE NETWORK AND INDIVIDUAL PARTICIPANTS

BACKGROUND

Mobile communication devices such as smart phones have become an integral part of the lives of many people; the number of mobile communication devices in use continues to grow. These mobile communication devices are powerful computers that can connect via various data paths and protocols.

It is typical for mobile communication devices to connect with the Internet and each other by communicating directly with cellular base stations or wireless access points.

BRIEF DESCRIPTION OF THE DRAWINGS

FIG. 3 illustrates an example participant table 120 that tracks participants in the cognitive heterogeneous ad hoc mesh network in accordance with embodiments described herein.

DETAILED DESCRIPTION

Figure 1A:
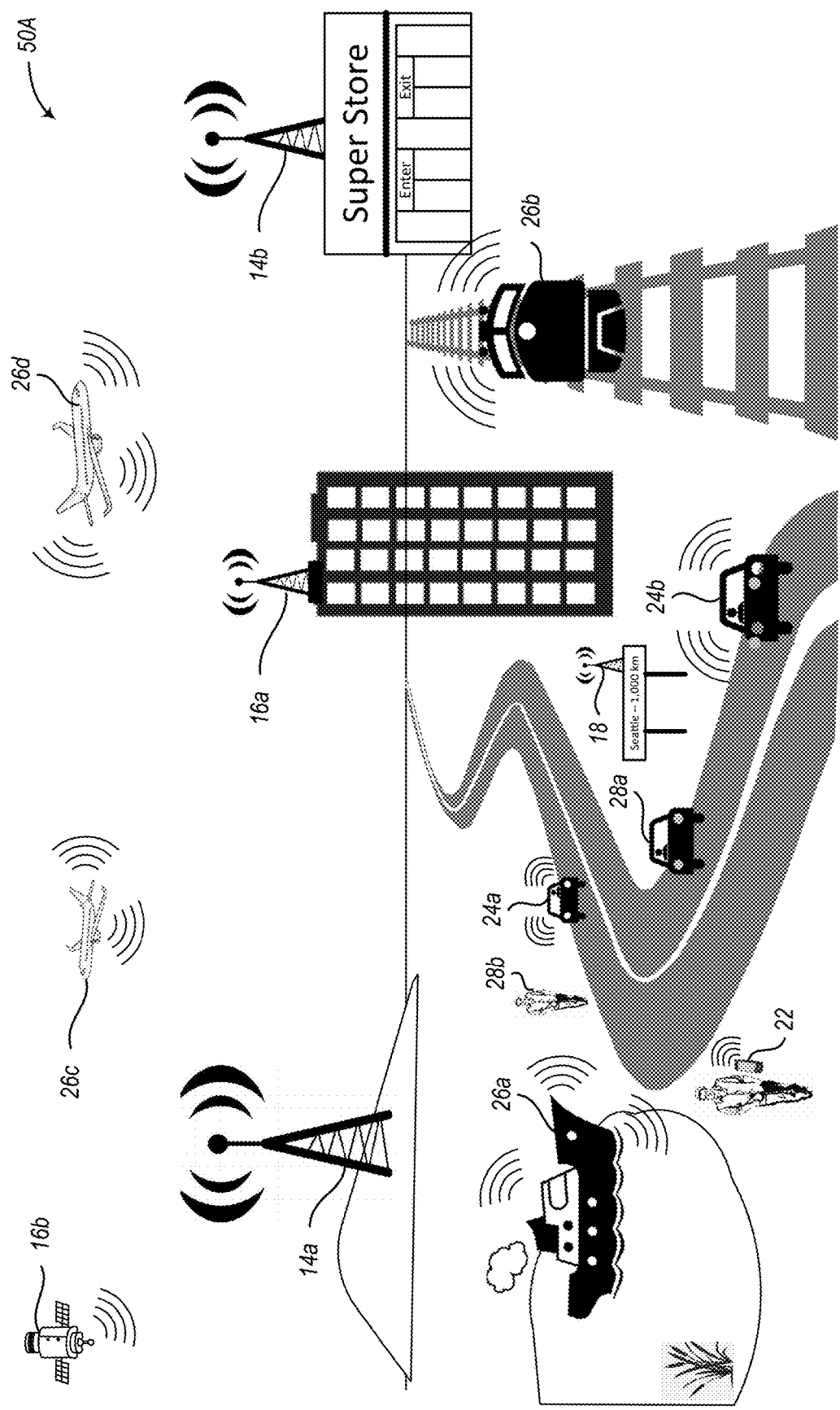
FIGS. 1A-1B illustrate context diagrams of an environment for establishing an ad hoc mesh network in accordance with embodiments described herein.

The inventors have recognized that the conventional approach in which mobile communication devices only communicate directly with cellular base stations or wireless access points is unnecessarily limiting. For example, there are geographic locations where no cellular base stations or wireless access points are permanently sited, or otherwise consistently operating. Additionally, under some conditions, cellular base stations and wireless access points (collectively referred to as "base stations" below) can become disabled, or their performance can be limited in a way that reduces their range and/or bandwidth. For example, base stations can become performance-limited or disabled by power outages or reductions, breaks in wired network links upon which they depend, failure of hardware or software components, adverse weather, natural disasters, human conflicts, or intentional sabotage.

In response to recognizing this disadvantage of conventional wireless networking, the inventors have conceived a facility having software or hardware or a combination of software and hardware for operating ad hoc wireless networks—such as mesh networks, also called peer networks—in which mobile communication devices ("network participants," "mobile participants," or "participants") communicate directly with one another. In the network mesh that results from direct communication among network participants, the facility controls the network participants to select radio power levels that best serve the network and individual participants.

In some embodiments, the facility adjusts a participant's transmission power level to be the same as all other participants in the network. In some embodiments, the facility adjusts a participant's transmission power level separately with respect to individual participants in the network.

In some embodiments, the facility raises or lowers a participant's transmission power level in response to the levels of success that that participant achieves in transmitting data to other participants in the network. In some embodiments, the amount by which the facility raises or lowers the participant's transmission power level power is (1) arbitrary; (2) set as part of an efficient search for the optimal power level; or (3) based on an estimate of the needed power to reach particular participants, based on factors that include distance between participants.

In some embodiments, the facility adapts data routing patterns among the network's participants to optimize energy usage by the participants. In various embodiments, the facility adjusts routing in a way that achieves shorter hops between participants; achieves fewer hops; alternates among substitutable nodes to share the energy consumption cost among them; and/or directs traffic to participants with the greatest levels of stored energy, especially traffic that must travel long-distance hops at high power levels.

In some embodiments, the facility monitors for and responds to the occurrence of interference in communications within the network. In some such embodiments, the facility reduces transmission power levels in one or more participants likely to be responsible for the observed interference. In some such embodiments, the facility adjusts routing patterns to partially or completely reroute either the traffic that was interfered with, or the traffic that most likely produced the interference.

In some embodiments, the facility places special focus on participants who provide an important benefit to network, e.g., those that are on the only path to the Internet, or other important resources. In some such embodiments, the facility minimizes or otherwise reduces the energy expended by these participants, sometimes at the expense of participants outside of this group.

By operating in some or all of the ways described above, the facility reduces radio interference among its participants, reducing ineffective communications and repeated transmissions; manages participant battery levels for longer life despite continuing network efficacy; and/or reduces the overall energy consumption of either the entire network, or a portion of the network whose continued operation is deemed important, such as a group of participants on an essential route to the Internet or other important data storage/retrieval resources, or processing resources.

In each of the ways outlined above, the facility improves the functioning of computer or other hardware, such as by reducing the processing, energy storage, data storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task.

As referred to herein, a "participant" is an object that includes a computing device that can communicate specific, predetermined types of information and data to other participant objects via line-of-sight communications. In some embodiments, each participant may be a member of a universal service-level agreement to identify which objects are participants, which allows for participants to communicate with one another without having to get user authorization for each individual connection between participants.

As discussed in more detail herein, participants can be mobile or stationary and may include computing devices of different sizes having different computing or networking capabilities. Throughout this disclosure, the term "participant" is used interchangeably with "participant object" and "participant computing device" and "node" and other related variations, and the term "non-participant" is used interchangeably with "non-participant object" and other related variations.

As referred to herein, "line-of-sight communication" refers to wireless transmission of information from a participant to another participant without other retransmission devices. A line-of-sight communication may also be referred to as a single hop from one participant to another participant or a direct communication between participants. Accordingly, line-of-sight is the maximum range one participant can communicate wirelessly with another participant without significant data loss. Examples of wireless transmissions used in line-of-sight communications include Bluetooth, Wi-Fi, ADSB, TCAS, or other protocols now known or developed in the future. In some embodiments, all communications between participants utilize a common protocol.

Figure 1B:
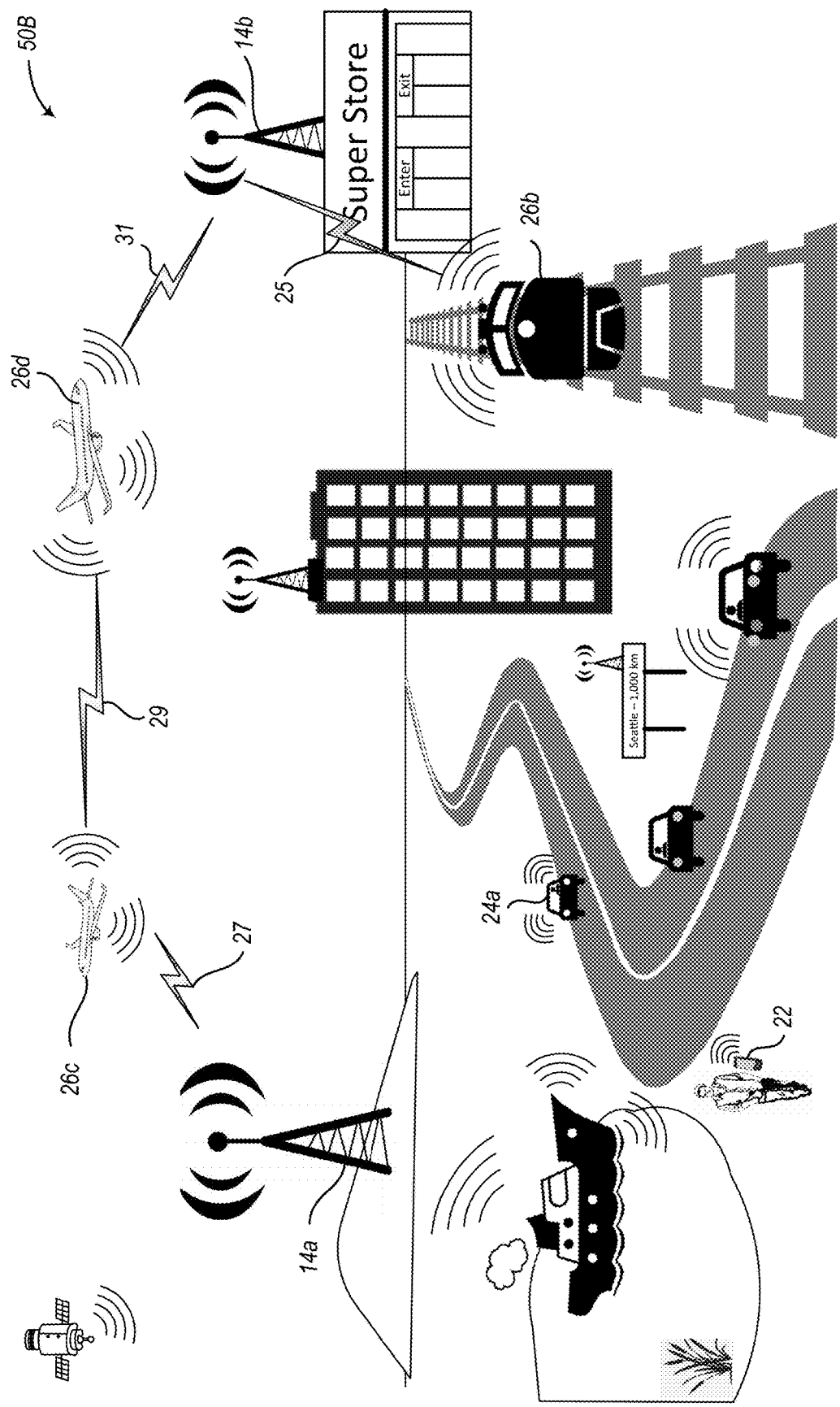

FIGS. 1A-1B illustrate context diagrams of an environment for establishing an ad hoc mesh network in accordance with embodiments described herein. In various embodiments, the facility may implement some or all embodiments described herein with respect to generating and maintaining the ad hoc mesh network. Environment 50A in FIG. 1A includes a plurality of mobile participants (referenced in some figures as mobile participants 36), a plurality of stationary participants (referenced in other figures as stationary participants 34), and a plurality of non-participants 28a-28b. As mentioned above, the stationary participants and the mobile participants can communicate specific types of information or data with one another, but cannot communicate the same types of information with the non-participants 28a-28b.

The plurality of mobile participants includes tier 1 mobile participants, tier 2 mobile participants, and tier 3 mobile participants. The three tiers of mobile participants are generally separated by the computing and networking capabilities of the computing devices associated with the mobile participant. The computing and networking capabilities may be limited or determined by the amount of power available or utilized by a mobile computing device, the amount of processing power available, the size or type or accuracy of the antenna utilized, etc.

For example, tier 1 mobile participants typically have the smallest available power, lowest processing power, lowest bandwidth, shortest ranged antenna, lowest power output, lowest accuracy, and slowest update rate. Examples of tier 1 mobile participants include, but are not limited to, mobile phones, laptop computers, tablet computers, wearable computing devices, or other smaller, low power, low transmission mobile computing or Internet-of-Things devices. In the example illustrated in FIG. 1A, there is only a single tier 1 mobile participant 22, which happens to be a mobile phone in this example. However, other numbers and types of tier 1 mobile participants may also be employed.

Tier 2 mobile participants typically have medium power constraints, a medium amount of processing power, medium bandwidth, medium range capabilities, medium accuracy, and medium update rate. Examples of tier 2 mobile participants include, but are not limited to, automobiles, small personal boats, personal aircrafts, or other medium power, medium transmission, power regenerating mobile computing devices or objects that can support such mobile computing devices. FIG. 1A illustrates example tier 2 mobile participants as including automobiles 24a and 24b. However, other numbers and types of tier 2 mobile participants may also be employed.

Tier 3 mobile participants typically have the largest available power, highest processing power, highest bandwidth, longest transmit and receive capabilities, highest accuracy, and fastest update rate among mobile participant computing devices. Example tier 3 mobile participants include, but are not limited to, commercial airline planes, semi-trucks, cargo ships, trains, or other objects that can support larger, high power, high transmission mobile computing devices or objects that can support such mobile computing devices. FIG. 1A illustrates example tier 3 mobile participants as including boat 26a, train 26b, and airplanes 26c and 26d. However, other numbers and types of tier 3 mobile participants may also be employed.

Various embodiments described herein refer to mobile aerial participants or mobile ground participants. Mobile aerial participants and mobile ground participants are mobile participants. Thus, mobile aerial participants and mobile ground participants may likewise be separated into the three-tiers of participant capabilities.

For example, tier 1 mobile aerial participants may include personal computing devices that are onboard an airplane, such as user devices; tier 2 mobile aerial participants may include general aviation aircraft; and tier 3 mobile aerial participants may include cargo aircraft and commercial aircraft. Tier 1 mobile ground participants may include personal computing devices that are on a person walking down the street or on a car or in a boat; tier 2 mobile ground participants may include automobiles or recreational watercraft; and tier 3 mobile ground participants may include semi-trucks and cargo ships.

In some embodiments, one or more of these tiers may be further separated by capabilities or expected utilization. For example, tier 3 mobile aerial participants may include tier 3A mobile aerial participants that include cargo aircraft and tier 3B mobile aerial participants that include commercial aircraft. One situation where this distinction may occur is where a commercial aircraft is handling a lot of data requests from user devices onboard the aircraft (e.g., tier 1 mobile aerial participants), which may impact that aircraft's throughput for forwarding communications between other participants. Conversely, a cargo aircraft is typically not handling a lot of data request from user devices onboard the aircraft, but is instead primarily being used to forward communications between other participants.

Although some embodiments may be described herein with respect to mobile aerial participants, embodiments are not so limited. Those same embodiments may instead utilize mobile ground participants or a combination of mobile ground participants and mobile aerial participants, unless the context clearly indicates otherwise.

The plurality of stationary participants includes ground entry points, remote entry points, and access nodes. In some embodiments, stationary participants may be referred to as ground participants. Similar to the three tiers of mobile participants, the ground entry points, remote entry points, and access nodes are generally separated by computing and networking capabilities, and footprint size in some embodiments.

For example, ground entry points typically have the largest available power, highest processing power, highest bandwidth, and longest range antenna capabilities. Example locations of ground entry points include, but are not limited to, cellular towers, airports, large retail or superstores, or other locations that can support large sized, high power, high transmission stationary computing devices. FIG. 1A illustrates example ground entry points as including tower antenna 14a and superstore 14b. However, other numbers and types of ground entry points may also be employed.

Remote entry points typically have medium power constraints, a medium amount of processing power, medium bandwidth, and medium range capabilities. Example locations of remote entry points include, but are not limited to, restaurants and coffee shops, airfields and train stations, satellites, or other locations that can support medium sized, medium power, medium transmission stationary computing devices. FIG. 1A illustrates example remote entry points as including store antenna 16a and satellite 16b. However, other numbers and types of remote entry points may also be employed.

Access nodes 18 typically have the smallest available power, lowest processing power, lowest bandwidth, and shortest range antenna capabilities of the stationary participants. Example locations of access nodes 18 include, but are not limited to, road intersections, train crossings, road signs, mile markers, crosswalks, or other locations that can support smaller, low power, low transmission stationary computing devices. In the example illustrated in FIG. 1A, there is only a single access node 18, which happens to be a road sign in this example. However, other numbers and types of access nodes 18 may also be employed.

As described in greater detail below, the mobile and stationary participants communicate with one another to pass information from one participant to another, which is further illustrated in FIG. 1B.

Environment 50B in FIG. 1B provides additional details regarding environment 50A in FIG. 1A, and likewise includes a plurality of mobile participants, a plurality of stationary participants, and a plurality of non-participants. Participants can communicate with other participants or with non-participants by forwarding communications between participants. Each participant utilizes a locally stored participant table to determine a next participant in which to send communications along an optimum route between the sending participant and the destination device, which is described in more detail below.

Briefly, however, in this example, participant airplane 26c is attempting to communicate with participant train 26b. If participant airplane 26c is within line-of-sight of train 26b, then the two participants could communicate directly with one another. But if airplane 26c cannot directly communicate with train 26b, then airplane 26c will communicate with train 26b via other participants.

Airplane 26c utilizes a participant table to identify one or more routes from airplane 26c to train 26b via zero, one, or a plurality of other participants. Creation and update of the participant table is discussed in more detail below.

In some embodiments, each participant that forwards a communication message may modify the additional route information to remove route information for previous participants along the route, which allows subsequent participants to transmit less and less data for each hop along the route. In other embodiments, the additional route information is maintained so that the destination participant knows the route of the messages and can reuse the same route to transmit return messages to the originally sending participant, or the destination can recalculate a new route.

In some embodiments, a participant along the route may determine that it should re-calculate a route from that participant to the destination participant. In one embodiment, this determination may be based on the participant not being able to transmit messages to the next participant identified in the additional route information included with the messages, such as if the participant and the identified next participant are no longer in line-of-sight communication with one another. In another embodiment, the participant may re-calculate the route if the connection between the participant and the next participant has significantly deteriorated, e.g., the individual score between that corresponding participant pair has exceeded a threshold value. In one example, the individual score may change based on a system limitation of the participant or the next participant, such as if Doppler effects between the participant and the next participant exceeds a threshold value based on the antenna capabilities of the participant and the next participant. For the illustrated example, tower 14a may perform similar actions as airplane 26c by using the participant table to determine a next participant in which to forward the messages destined to train 26b.

In these examples, the communication links 25, 27, 29, and 31 are line-of-sight communication transmissions from one participant computing device to another. As described elsewhere herein, these transmissions may be non-directional transmissions or they may be directional transmissions.

Even though FIGS. 1A and 1B are illustrated with stationary participants, the line-of-sight communications described herein enables mobile participants to communicate with one another without having to be in line-of-sight communication of a stationary participant, which reduces the need for a complex stationary infrastructure. Moreover, embodiments described herein enable mobile participants to communicate with one another even if the stationary participants become unavailable or if wired communication networks between stationary participants become interrupted. Moreover, the stationary participants can communicate with other participants without the need for specialty hardware for different cellular carriers or networks, rather it can rely on common line-of-sight wireless protocols, such as Wi-Fi technology under the IEEE 802.11 standards, as well as ad hoc protocols now known or developed in the future.

As mentioned above, each participant can select another participant through which it can forward communication messages based on a participant table. The participant table identifies each participant, where each participant is located, how each participant is moving, which participants are within line-of-sight of each other, and various different characteristics or communication capabilities between line-of-sight participants. Creating, updating, and using the participant table is described below, and one example participant table is illustrated in FIG. 3.

The overarching ad hoc mesh network created by the mobile and stationary participants described above in conjunction with FIGS. 1A-1B provides a backbone for a multi-layered network that enables one participant to communicate with another participant, while also providing safety measures to avoid collisions among participants and non-participants.

Figure 2A:
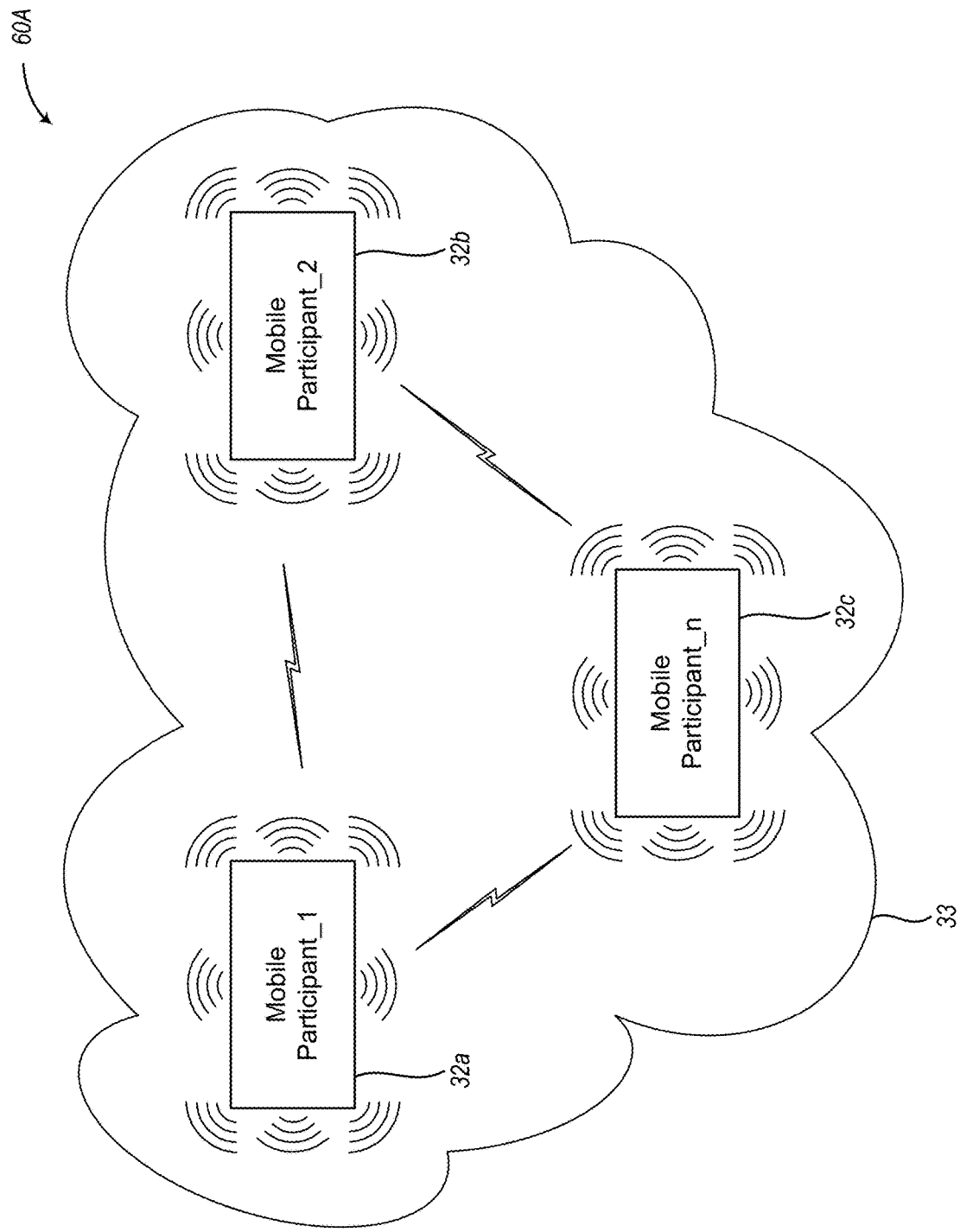
FIGS. 2A-2B illustrate block diagrams of the different layers of the ad hoc mesh network in accordance with embodiments described herein.
Figure 2B:
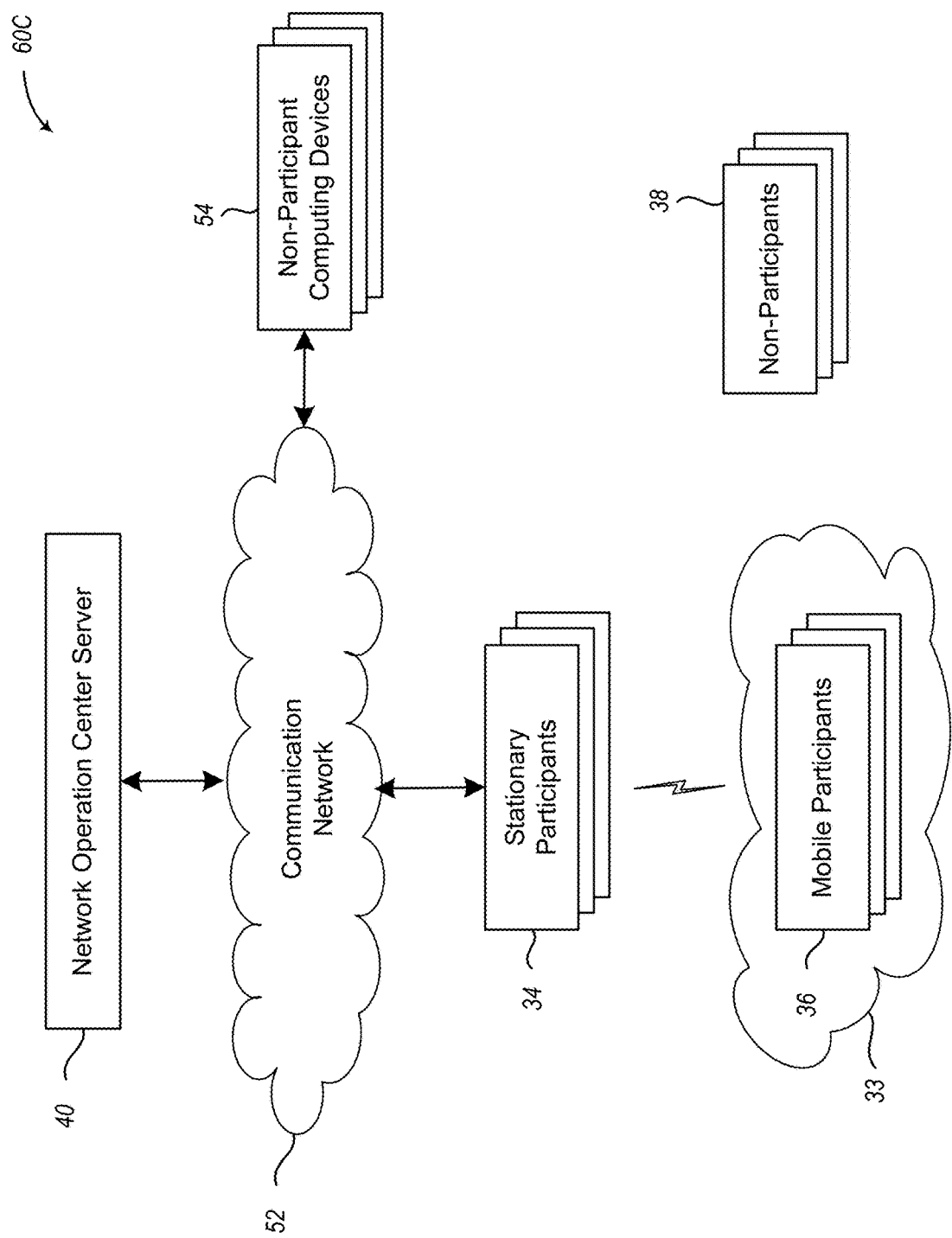

FIGS. 2A-2B illustrate block diagrams of the different layers of the ad hoc mesh network in accordance with embodiments described herein. FIG. 2A illustrates an example 60A of a communications network 33 between a plurality of mobile participants 32a-32c. Although FIG. 2A only illustrates three mobile participants as creating network 33, embodiments are not so limited and one or a plurality of mobile participants may be employed. Similarly, the network 33 may be established from other types of mobile participants, including various combinations of tier 1 mobile participants, tier 2 mobile participants, or tier 3 mobile participants, which perform many of the same functions as the mobile participants.

Each mobile participant 32a-32c transmits radio frequency signals to be received by other mobile participants that are within line-of-sight of the sending mobile participant. These signals include, but are not limited to (1) data signals that transmit messages or data to another participant and (2) notification signals that provide personalized information regarding the sending mobile participant. In some embodiments, the notification signals are referred to as self-reporting messages or self-reporting signals. The notification signals can include one or both of notification signals for networking and routing among participants and notification signals for safety and de-confliction of possible threats.

The notification signals serve three primary simultaneous purposes: (1) to notify other participants of the sending participant's identity, position, and kinematic information; (2) to detect and track non-participant objects; and (3) to establish routing and network efficiencies (i.e., to create the participant table described herein). In various embodiments, the notification signals provide individualized information regarding the sending mobile participant so that other mobile participants know that they are within line-of-sight communication of the sending mobile participant within network 33. As mentioned above, these notification signals may be referred to as self-reporting signals, since the mobile participant is independently reporting its position and kinematic information to any other mobile participants 32 that are within line-of-sight of the transmitting mobile participant 32 without being prompted or requested by another mobile (or stationary) participant. The mobile participants 32 utilize the notification signals to generate a participant table that is utilized to transmit data signals between the mobile participants 32.

In various embodiments, the information in the notification signal includes the mobile participant's 32 identification information, geolocation, kinematic information, throughput capabilities, frequency capabilities, and other information. In various embodiments, the notification signals also include transmission time information that allows for Time Distance of Arrival (TDOA) and Time of Flight (TOF) or Round Trip Timing (RTT) calculations.

The geolocation of the mobile participant 32 may be determined via traditional methods like GPS sensors or modules, cell tower or stationary participant signal triangulation, or via notification messages from other devices or participants that know or estimate the position or location of the mobile participant 32. This can be accomplished with extreme accuracy and minimal latency when notification messages are echoed and supported by stationary participants. The geolocation may also be referred to as the position or location of the mobile participant 32.

The kinematic information may be obtained by monitoring the mobile participant's 32 position and identifying changes over time, utilizing various sensors to calculate or determine the kinematic information, or obtaining it from another system.

The frequency capabilities of the mobile participant 32 may be predetermined based on the type of hardware utilized by the mobile participant 32. For example, the hardware of the mobile participant 32 may be designed to utilize ACARS, IEEE 802.11 standards, or some other wireless transmission frequencies or standards, which defines the frequency capabilities of the mobile participant 32. In other embodiments, the frequency capabilities may be predetermined based on government regulations regarding available frequencies. In yet other embodiments, the frequency capabilities may be defined by a user or administrator.

The throughput may be predetermined based on the type of hardware utilized by the mobile participant 32 or on the current processing capacity or network traffic of the mobile participant 32 or a number of other factors. For example, if the mobile participant 32 is a Boeing 737-700 then it may have more throughput capabilities than a Boeing 777-200ER because the Boeing 737-700 may have less passengers and thus may be supporting fewer data requests from user device onboard the airplane, which can allow for more possessing power to be directed towards forwarding communications between other participants.

In some embodiments, notification signals are transmitted via directional broadcast beams. In other embodiments, the notification signals may be transmitted using non-directional broadcast signals. In general, the use of the term "broadcast" herein refers to the transmission of a signal by a sending participant without being requested by another participant and does not have a specific participant as a destination. In various embodiments, directional notification signals may be transmitted in a sequential or non-sequential 360-degree pattern, so that the notification signal is transmitting in all directions surrounding the participant.

Use of directional transmissions can reduce the amount of power needed to transmit the notification signal or other communication to another participant. Moreover, the use of directional transmissions enables the sending participant to use just enough power to ensure it gets to its intended target. The participant table described herein enables the participants to calculate the required transmit power for transmission without wasting extra power on an overly powerful transmission. Additionally, directional transmissions can reduce interference between transmissions in a congested space as well as make transmissions more secure.

The notification signal may be broadcast periodically, at predetermined times, dynamically selected based on number and proximity of other mobile participants, or at a given dynamically changing update rate. In some embodiments, the rate at which the mobile participant 32 transmits its notification signal may change based on a combination of the distance, closure velocity, and closing angles between the sending mobile participant 32 and other mobile participants 32 within line-of-sight of the sending mobile participant 32.

As mentioned above, the mobile participants 32a-32c broadcast notification signals to inform other mobile participants 32 of their position and movement. For example, mobile participant 32a broadcasts notification signals with information identifying itself and its respective geolocation and kinematic information without regard to the presence or location of mobile participants 32b or 32c. If mobile participant 32c is within line-of-sight of mobile participant 32a, mobile participant 32c receives the broadcasted notification signals from mobile participant 32a and utilizes the information in the notification signals, and its own location and kinematic information, to identify the position and movement of mobile participant 32a relative to itself.

The mobile participants 32 can utilize the notification signals to track other participants and to create and update the participant table to identify which participants are in network 33, their location, their capabilities, and who they are in line-of-sight communication.

As mentioned above, the notification signals are utilized to generate and maintain a participant table so that the mobile participants 32 can transmit messages or data to one another within network 33. For example, the participant table is utilized to determine a recipient participant. The sending mobile participant 32 then transmits a data signal destined for a target mobile participant 32. The data signals are used to transmit the desired messages or data to other participants, which is described in more detail below in conjunction with FIG. 2B. Briefly, the various communications between the mobile participants 32a-32c creates a communication network 33 among each other that enable them to communicate with one another without the use of another communication backbone, such as a cellular tower network.

Similar to the notification signals, the data signals may be transmitted via directional transmission beams or non-directional transmission signals. In various embodiments, the sending mobile participant 32 utilizes the participant table to determine a location of the recipient participant. The sending mobile participant 32 can directionally focus the transmitted data signals towards the recipient participant based on the position of the sending participant and the position of the recipient participant. The use of directional transmissions can reduce power consumption and increase the range in which transmission can be received, while also reducing interference between transmissions in a congested space.

Although not illustrated, other mobile participants and stationary participants may also perform similar actions as described above to identify and track mobile participants that are in line-of-sight to support management of the participant table and to communicate data or information amongst themselves to increase accuracy and efficiency of each participant.

The messages or information contained in the data transmissions may have originated by the sending participant or it may have originated by another computing device and is now being forwarded by the sending participant. In some embodiments, the data may originate at one participant and be destined for another participant. In other embodiments, the data may originate at a non-participant computing device (e.g., content servers, web servers, remote networks, etc.) and be destined for a participant. In yet other embodiments, the data may originate at one participant and be destined for a non-participant computing device.

If the sending participant is within line-of-sight to a destination participant, then the originating participant sends the message or data directly to the destination participant. But if the sending participant is not within line-of-sight to the destination computing device, then the sending participant transmits the message or data to another participant who can continue to forward the message or data toward the destination computing device, which may include one or more "hops" between mobile or stationary participants.

In some embodiments, the data signals may be transmitted whenever the participant has data to be sent and has bandwidth or computing power to transmit the data. In other embodiments, the data may be buffered for a period of time until it can be successfully transmitted from the sending participant to another mobile or stationary participant.

In various embodiments, the participants may use one of various different frequencies to transmit data signals to other participants. In some embodiments, participants scan the entire spectrum or spectrums they are physically able, and legally allowed, to transmit within. Each participant determines based on real-time and historical data what frequencies are available and the length of transmission that can be transmitted without interference on each frequency, as well as what transmitters are available on the participant. In some embodiments, the participants may utilize Dynamic Spectrum Access (DSA) to use multiple frequencies for a single transmission to make full use of the available spectrum. Participants can "sniff" the spectrum and identify free space to use and make such information available to other participants via the participant table. For example, if an airplane is in a thunderstorm it can identify and avoid those frequencies that are unusable for use in unstable whether, and it knows what participants are within range and what frequencies they have available to retransmit to a stationary participant, if required. From this information in the participant table, the aircraft can choose the appropriate frequency/frequencies to transmit on to obtain the highest data-rate while maintaining a signal to noise ratio that ensures data packet reception.

In various embodiments, each participant determines a Quality of Service (QOS) and Signal to Noise Ratio (SNR) between it and each other participant in line-of-sight of that participant, as well as available frequencies to the receiving participant. The participant then assesses the data it needs to transfer and chooses the most efficient frequency with a high QOS and SNR on which to transmit. Moreover, participants may utilize additional information to select what frequencies to transmit data. For example, if a participant is in a thunderstorm, it selects frequencies that are more suitable for use in inclement weather.

The participant can cross reference the throughput and frequency abilities of the other participants, via the participant table, to determine the path and frequency on which to send the data. Once that is determined, the participant can route the data and amplify the signal based on the frequency, distance or latency to the chosen participant, and any known interference values it may have.

In some embodiments, each participant utilizes protocols to establish transmit priorities based on the participant's role at any given moment. For example, an aircraft prioritizes safety of flight information first, then ATC communications, navigation, identification, headquarter communication, then Internet/entertainment connectivity. A cell phone, depending on environment, may act in different ways. For example, at home, it may prioritize Wi-Fi frequencies and prioritize voice communications, then text, then Internet, then email. However, when the cell phone is in a car traveling down the road, the cell phone can use its gyrometers and accelerometers to detect that you are in a vehicle and set the priorities for V2X (vehicle to vehicle/Infrastructure/Pedestrians/other transportation) above voice, text and Internet data exchanges. In contrast, if the cell phone is in a bus or train it may not transmit V2X information.

As mentioned above with respect to FIG. 2A, the multi-layered network allows each participant to track other participants that are local or proximal to the participant, while also tracking transmitted data among participants. The multi-layered network also includes a top layer that provides global tracking of participants and non-participants, and data communication with non-participant computing devices, which is illustrated in FIG. 2B.

FIG. 2B illustrates a block diagram of the highest layer of the multi-layered network. Example 60C in FIG. 2B includes mobile participants 36, stationary participants 34, and network operation center server 40.

Mobile participants 36 and stationary participants 34 employ embodiments described herein to transmit notification signals to generate a participant table to track participants, their location, and the communication characteristics between line-of-sight participants. In various embodiments each stationary participant 34 stores a complete copy of the participant table. When a stationary participant 34 receives an update to the participant table from a mobile participant 36, the stationary participant 34 transmits the update to the other stationary participants 34. The stationary participants 34 also transmit, upon receipt of an update or at predetermined times, the total participant table or only a portion thereof to the mobile participants 36 that are in line-of-sight communication of that corresponding stationary participant 34, which can then be forwarded by the mobile participants 36 to other non-line-of-sight mobile participants 36.

In some other embodiments, the stationary participants 34 may maintain or store a portion, but not all, of the total participant table. For example, each stationary participant 34 stores the portion of the participant table for mobile participants 36 that are within a predetermined distance or number of hops away from the corresponding stationary participant 34. In at least one such embodiment, the stationary participants 34 may provide updates to the network operation center server 40 via communication network 52, which can then distribute the update, i.e., only the update, the total participant table, or a portion of the participant table, to other stationary participants 34. In some embodiments, the network operation center server 40 or the stationary participants 34 can add additional information to the participant table, such as the location of non-participants, which may be obtained from FAA reports, weather radar, local tracking by the mobile participants 36 or the stationary participants 34, or other sources.

As discussed herein, mobile participants 36 utilize the participant table to transmit or forward data or data requests to other mobile participants 36 or to non-participant computing devices 54. Accordingly, the mobile participants 36 communicate with stationary participants 34 (either via line-of-sight communications or via one or more other mobile participants 36) to send and receive data to and from the non-participant computing devices 54 via communication network 52.

The communication network 52 may be any wired or wireless communication network that facilitates the transmission of information from stationary participants 34 to network operation center server 40. In some embodiments, communication network 52 may be the Internet.

In various embodiments, the mobile participants 36 may also provide additional information to the stationary participants 34 and to the network operation center server 40. For example, in some embodiments, the mobile participants 36 may utilize echo signals from the notification signals to track non-participant objects 38, which is described in more detail in U.S. patent application Ser. No. 15/892,259, filed Feb. 8, 2018, entitled "Object Tracking Using A Cognitive Heterogeneous Ad Hoc Mesh Network."

FIG. 3 illustrates an example participant table 120 that tracks participants in the cognitive heterogeneous ad hoc mesh network in accordance with embodiments described herein. Participant table 120 includes individual participant information 122 and line-of-sight participant information 124.

The individual participant information 122 separately identifies multiple participants 126a-126b. For each participant, the individual participant information 122 includes an identifier 128 for the corresponding participant, and kinematic information 130 of the corresponding participant which can include location information of the corresponding participant. Spectrum capabilities 131 of the corresponding participant describe the available media type associated with this node. Also included is a timestamp 132 indicating the time at which the information for the corresponding participant was determined or updated, and a routing score 133 determined by the participant computing this table 120 for the peer participant. The individual participant information 122 may also include other information, not shown, such as radio or processing capabilities of the corresponding participant, security protocols or encryption information, system limitations, or other information.

The line-of-sight participant information 124 lists those participants that are within line-of-sight communication of participants 126a-126b, which establishes each participant pair in the participant table 120. For example, corresponding line-of-sight participants 148a-148b are in line of sight of participant 126a.

The line-of-sight participant information 124 includes an identifier 134 for each corresponding line-of-sight participant 148a-148d, a quality of signal 136 for the notification signal sent by the corresponding line-of-sight participant that was received by the corresponding participant 126a-126b, frequency capability 138 and spectrum 140 capabilities of each corresponding line-of-sight participant, and a routing score 141 as determined by the other line-of-sight participant. The signal to noise ratio 142 is also monitored and included.

In some embodiments, the line-of-sight participant information 124 also includes the weighted value 144 between each corresponding participant pair. The weighted value 144 is the individual score for that corresponding participant pair, which is based on a weighted combination of the latency in transmissions between the pair participants, movement of the participants relative to one another (e.g., based on the difference between the kinematic information 130 of each participant in the pair), quality of signal 136 between the pair participants, frequency 138 and spectrum 140 capabilities between the pair participants (e.g., based on the spectrum capabilities 131), whether the timestamp 132 is beyond some threshold amount of time in the past, or other information, or any combination thereof. Distance may be a factor of latency because a total latency of a transmission is based on a processing time to transmit a communication, a flight time of the transmission (based on the distance between the participants and the speed at which radio waves propagate through the air), and a processing time to receive the communication. As described herein, participants may also include a routing score. In some embodiments, the weighted value 144 between individual participant and its line-of-sight peers takes into account the routing score of one or both participants. Moreover, the weighted value 144 may be modified, such as increased, if one of the participants is a routing participant.

Each of these types of information may be provided an initial score (e.g., if two airplanes are within 200 meters of each other then it may have a better, lower score than two airplanes 2 kilometers apart), which may be based on one or more thresholds or may be actual values. Each type of information is then weighted based on various factors that can impact the communication between the participant pairs. For example, in some situations, quality of signal may be more important and weighted higher than latency, but kinematic information may be more important and weighted higher than quality of signal (e.g., due to the potential data loss issues from Doppler effect or the potential to be out of line-of-sight). Thus, each type of information may be weighted based on its importance relative to the other types of information such that more important information has a higher weight than lower important information.

In at least one embodiment, the individual score between a participant pair may be based on system limitations of one or both of the participants in the participant pair. For example, participant antennas can generally account for some amount of Doppler shift/effects. However, if the participants of a participant pair are traveling towards one another at a high enough rate of speed, then the antennas may not be able to account for the Doppler shift/effects, which may result in a reduction of quality of service, throughput, or dropped information. Such system limitations may impact the individual score, which can result in calculating a route to avoid participant pairs that currently have or may have system limitations. In at least one such embodiment, one or more thresholds may be employed such that as the Doppler shift/effect becomes worse, the individual score also gets worse (e.g., increases).

In some embodiments, system limitations may be included in the participant table or may be deduced from information within the participant table. In other embodiments, some of these system limitations may not be included in the participant table or may change based on movement of the participants, which can result in increased latency or re-routing the communication.

In various embodiments, each corresponding participant updates its locally stored version of the participant table 120. Stationary participants can update the participant table 120 maintained by the stationary participants based on the information contained in the notification signal sent by the participants.

While FIG. 3 shows a table whose contents and organization are designed to make it more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

The operation of certain aspects will now be described with respect to FIG. 4. In at least one of various embodiments, processes 150 described in conjunction with FIG. 4 may be implemented by or executed on one or more computing devices, such as mobile participants 36. The processes described in conjunction with FIG. 6 may be implemented by or executed on one or more computing devices, such as mobile participants 36 or stationary participants 34.

Figure 4:
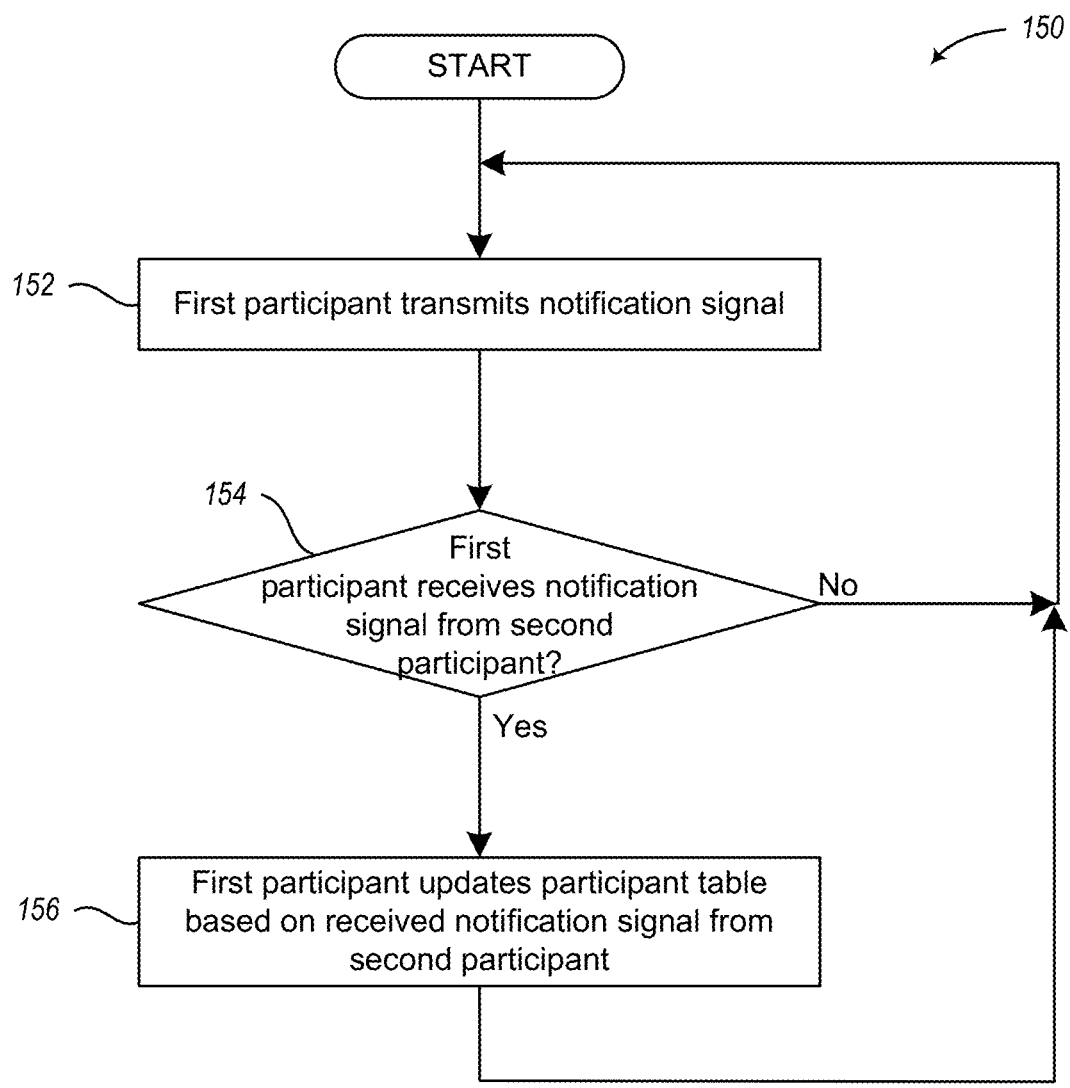
FIG. 4 illustrates a logical flow diagram showing one embodiment of an overview process for a mobile participant to transmit and receive notification signals to manage the participant table of a cognitive heterogeneous ad hoc mesh network in accordance with embodiments described herein.

FIG. 4 illustrates a logical flow diagram showing one embodiment of an overview process for a mobile participant to transmit and receive notification signals to manage the participant table of a cognitive heterogeneous ad hoc mesh network in accordance with embodiments described herein.

Process 150 begins in act 152, where a first mobile participant transmits a notification signal. In various embodiments, the first participant transmits the notification signal at a predetermined rate, periodically, at predetermined times, or based on various operating characteristics of the first participant. The rate at which notification signals are transmitted may be static or dynamic and may change based on the distance and rate of closure between other participants or the number of other participants within line-of-sight of the first participant.

Process 150 proceeds to decision act 154, where the first participant receives a notification signal from a second participant. In various embodiments, the first participant may process each notification signal sent by the second participant and received by the first participant. In other embodiments, the first participant may process a subset of the notification signals received from the second participant. If the first participant has received a notification signal from the second participant and the first participant is to process the notification signal, then process 150 flows to act 156; otherwise process 150 returns to act 152 to continue sending its notification signals and waiting for notification signal from other participants.

In act 156, the first participant updates its local version of the participant table based on the information in the received notification signal from the second participant. If the second participant is not in the participant table as being within line-of-sight communication of the first participant, the first participant adds the second participant to the participant table indicating that the first and second participants are within line-of-sight communication of one another, as a participant pair. If the second participant is already listed in the participant table, the first participant updates the participant table with the information from the received notification signal, such as the current location and kinematic information from the second participant. In some embodiments, the first participant updates the participant table to include additional information regarding the communication with the second participant, such as the quality of signal received from the second participant, signal to noise ratio 142, frequency or spectrum capabilities, etc. After act 156, the first participant continues in act 152.

Those skilled in the art will appreciate that the acts shown in FIG. 4 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 5:
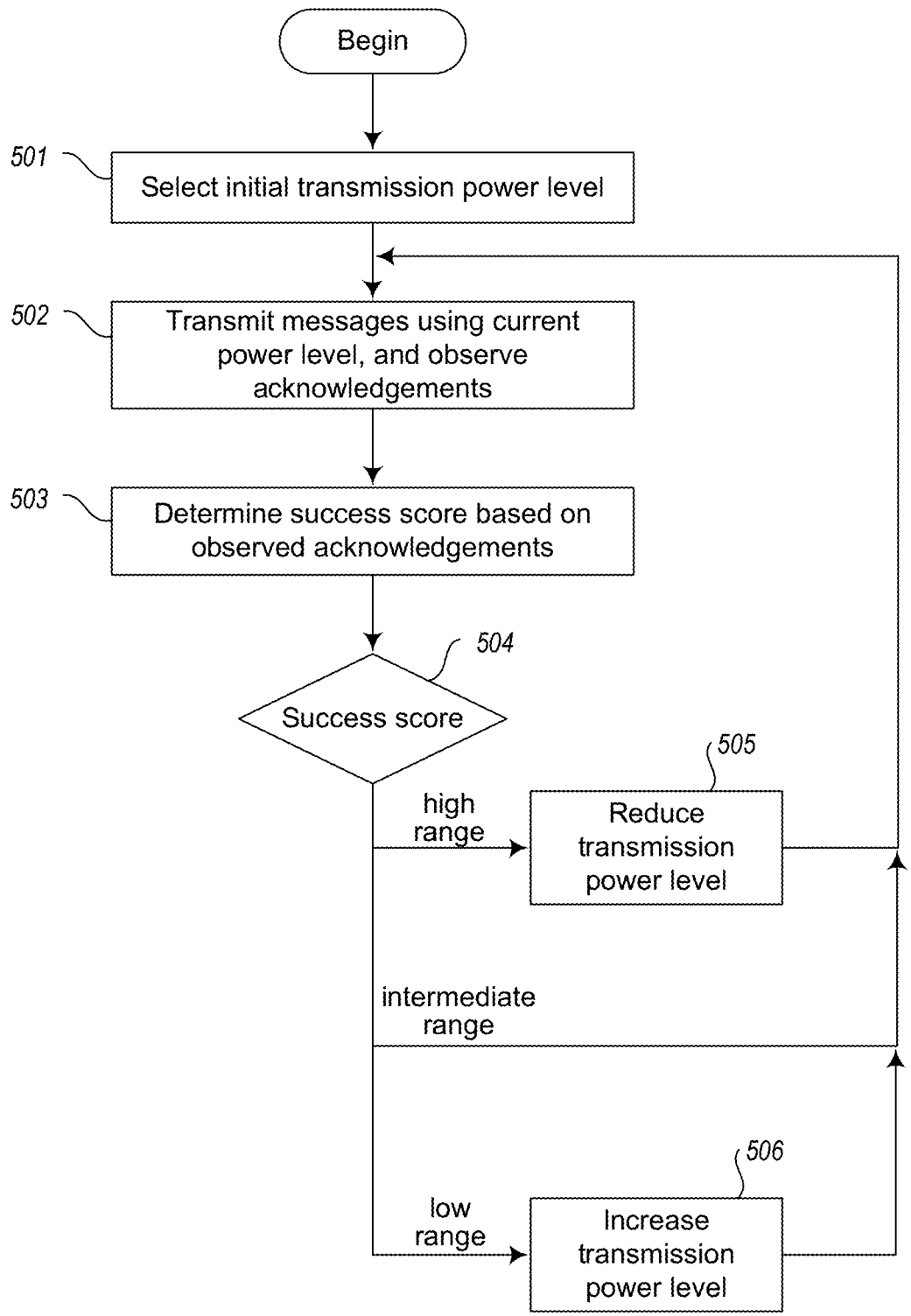
FIG. 5 is a flow diagram showing a process performed by the facility in some embodiments to search for an optimal or near-optimal transmission power level for a particular network participant.

FIG. 5 is a flow diagram showing a process performed by the facility in some embodiments to search for an optimal or near-optimal transmission power level for a particular network participant. The facility typically performs this process in each participant in the network. In some embodiments, the facility performs this process in a participant separately for each other participant with which a participant performing the process communicates directly, to obtain different transmission power levels to use with different correspondent participants. In some embodiments, the facility performs this process with respect to all of the participants with which the participant performing the process can directly communicate, to obtain a single transmission power level used by this participant to transmit to all other participants.

In act 501, the facility selects an initial transmission power level. In some embodiments, in act 501, the facility selects as the initial power level a predetermined default transmission power level. In some embodiments, the predetermined default transmission power level is the participant's radio's highest power level. In some embodiments, the facility selects an initial transmission power level in act 501 by selecting a power level that it estimates to be adequate to reach the other participants with respect to which the process is being performed, based upon the location of these participants with respect to the participant performing the process; these participant locations are in some embodiments stored or cached by the facility in the participant in which the process is being performed, such as in the participant table. In various embodiments, in addition to or instead of participant location, the facility may use other factors to select an initial transmission power level. For example, the facility can utilize the prevailing RF environment to select the initial transmission power level. The prevailing RF environment may include weather conditions, preexisting network traffic, preexisting RF utilization, foliage, other physical obstructions, Fresnel effects, or other factors that may impact RF transmissions, or any combination thereof. In some embodiments, the facility selects the initial transmission power level in act 501 based on a role the participant has in the network. For example, if the participant is handling critical or high-security communications between participants, then that participant's initial transmission power level may be higher compared to another participant that is simply using the network to access non-critical or low-security communications or transmitting notifications signals for self-safety purposes.

In act 502, the facility transmits one or more messages using the current transmission power level, and observes acknowledgements that are received in response to these messages. In some embodiments, the messages transmitted by the facility in act 502 are those transmitted to the other participants with respect to which the process is being performed in the normal course of the operation of the network. In some embodiments, the facility observes acknowledgments to these transmitted messages of three types: (1) acknowledgments indicating that the message was received in good condition; (2) acknowledgments requesting that the participant on which this process is being performed repeat the transmission of some or all of the message to remediate a failure to fully receive the message; or (3) the absence of any acknowledgment during a period of time when an acknowledgement would be expected, such as 1 second, 2 seconds, 15 seconds, etc. In some embodiments, the acknowledgement is a stand-alone message transmitted by the receiving participant. In some embodiments, the facility determines or infers the acknowledgement through communications received from the receiving participant. For example, the receiving participant may update its routing table to identify the signal quality between the receiving participant and the participant on which this process is being performed. When the receiving participant transmits a notification signal with its routing table, the participant on which this process is being performed can determine or infer the acknowledgement from the signal quality information in the routing table.

In act 503, the facility determines a success score for transmitting the messages in act 502, based upon the observed acknowledgments. In some embodiments, the facility determines the score by averaging or otherwise aggregating scores that it determines for each transmitted message. Such per-message constituent scores are higher for messages for which a successful acknowledgment is received; lower for messages for which an acknowledgment requesting retransmission is received; and lower still for unacknowledged messages. In various embodiments, the facility determines the success score from or modifies it based on other observed signal characteristics, such as signal quality, signal-to-noise ratio, latency, etc.

In act 504, the facility branches on the success score determined in act 503: if the success score is in a high range, then the facility continues in act 505; if the score is in an intermediate range, then the facility continues in act 502; and if the score is in a low range, then the facility continues in act 506. In various embodiments, the facility uses one or more numerical thresholds to distinguish the success score as high range, intermediate range, or low range. In various embodiments, these thresholds are automatically set—or manually set by an administrator of the facility—based on the role of the participants, the overall network status or health, the use of the network, the capabilities of the participants, etc.

In act 505, the facility reduces the transmission power level, such as by a certain absolute or relative increment. The amount of the increment may be a pre-selected amount, or it may be based on the success score. For example, the higher the success score then the higher the increment in which the transmission power level is reduced. After act 505, the facility continues in act 502. In act 506, the facility increases the transmission power level, such as by an absolute or relative increment. The amount of the increment may be a pre-selected amount or it may be based on the success score. For example, the lower the success score then the greater the increment by which the transmission power level is increased. After act 506, the facility continues in act 502. In the next iteration of act 502, the facility transmits the next the batch of messages using the transmission power level as adjusted in act 505 or 506, or as not adjusted in the case of the intermediate range. Examples of the facility's performance of this process are discussed below in connection with FIG. 6.

Figure 6:
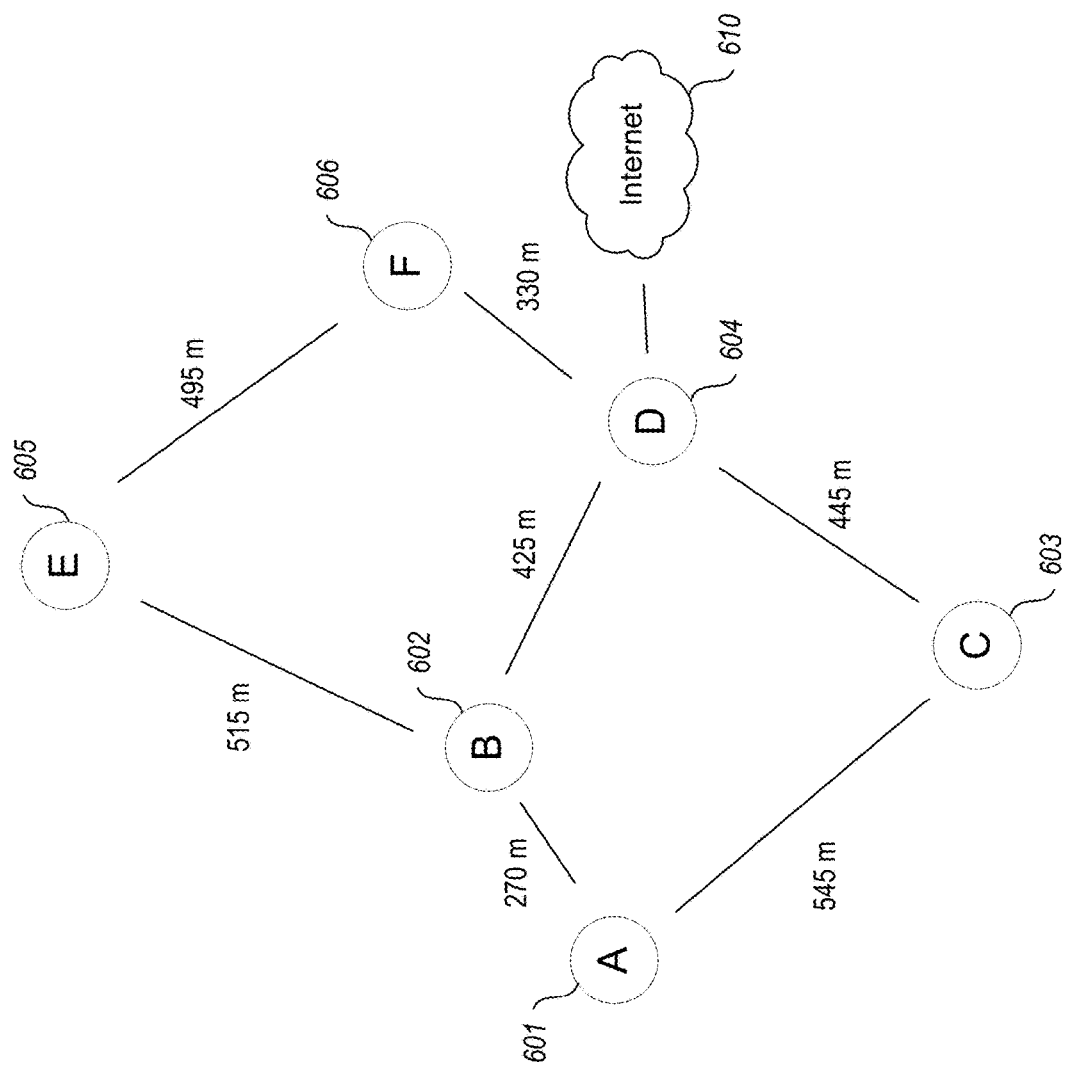
FIG. 6 is a network diagram showing a first configuration of an ad hoc peer wireless network operated by the facility.

FIG. 6 is a network diagram showing a first configuration of an ad hoc peer wireless network operated by the facility. Participant A 601 is in direct contact with participant B 602 and participant C 603. Participant B 602 is in direct contact with participant A 601, participant D 604, and participant E 605. Participant C 603 is in direct contact with participant A 601 and participant D 604. Participant D 604 is in direct contact with participant B 602, participant C 603, participant F 606, and Internet 610. Participant E 605 is in direct contact with participant B 602 and participant F 606. Participant F 606 is in direct contact with participant D 604 and participant E 605.

An example of the results of performing the process shown in FIG. 5 in participant E 605 shown in FIG. 6 follows. It can be seen in FIG. 6 that participant B can directly connect with participants A, D, and E. Table 1 below shows that, in the mode in which the facility performs the process to individually determine different transmission power levels for different target participants, the facility begins with an initial power level of 100% for all three of the correspondent participants.

TABLE 1

| participant | distance | initial power | equilibrated power |
|---|---|---|---|
| A | 71 m | 100% | 9% |
| D | 124 m | 100% | 28% |
| E | 163 m | 100% | 47% |

The facility eventually settles on a 9% power level for the nearest participant, participant A; a 28% power level for the participant D at an intermediate distance; and a 47% power level for participant E at the greatest distance. In some embodiments, the facility reaches these results based on distance/power law effect, signal-to-noise ratio, or contention considerations, or some combination thereof.

In some embodiments, the facility performs the process once in each participant in order to determine a single power level to use in transmitting to all of the correspondent participants. In this mode, the facility selects a power level of 47% for all of participant B's correspondent participants. In various embodiments, the facility performs the process when participants moves, when a participant enters to leaves the network, at selected time intervals, when the capabilities of a participant change, etc.

Figure 7:
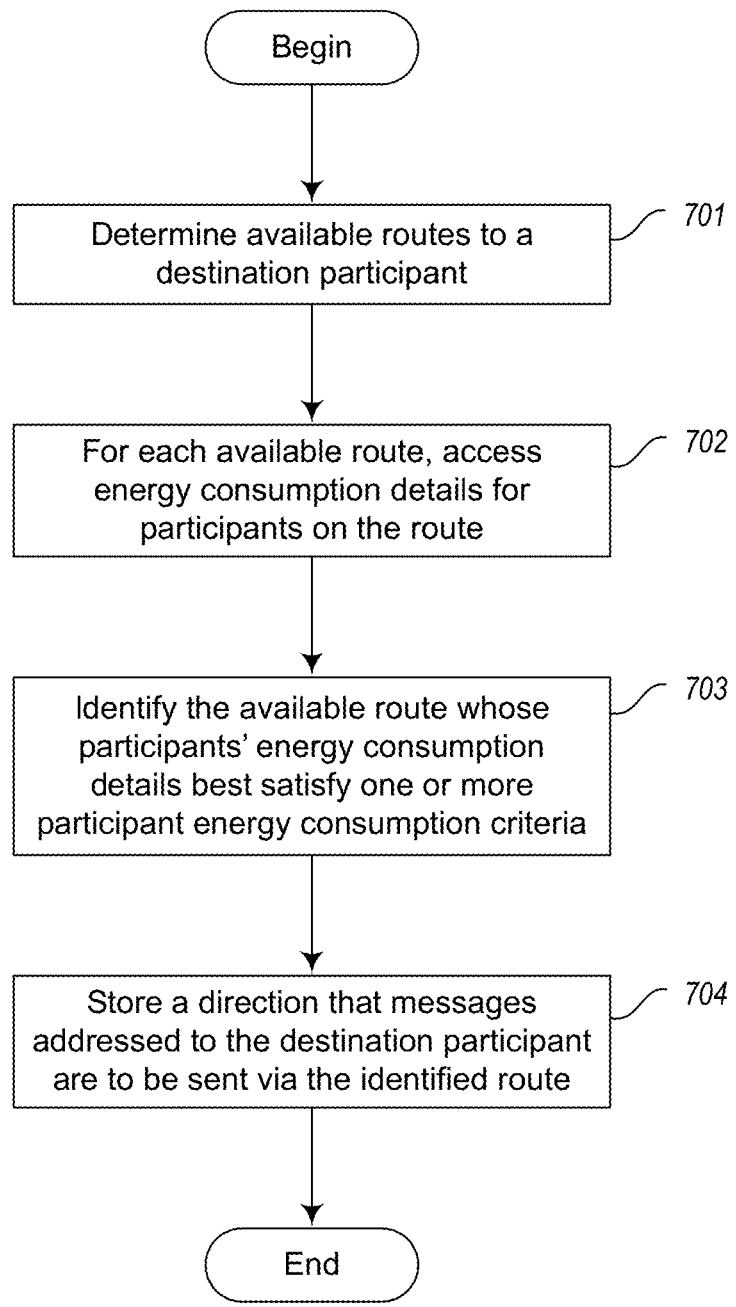
FIG. 7 is a flow diagram showing a process performed by the facility in some embodiments to adapt the routing patterns used by the network's participants to optimize energy usage by participants.

FIG. 7 is a flow diagram showing a process performed by the facility in some embodiments to adapt the routing patterns used by the network's participants to optimize energy usage by participants. In some embodiments, the facility performs this process in every participant in the network. In some embodiments, the facility performs this process only in specially-designated routing nodes. A discussion of how a network's routing nodes are selected and operate is included in U.S. patent application Ser. No. 17/489,437, filed on Sep. 29, 2021, which is hereby incorporated by reference in its entirety. In cases where documents incorporated herein by reference conflict with the present disclosure, the present disclosure controls. In some embodiments, the facility performs this process in a participant node multiple times, once for each other participant in the network, or each other participant in the network to which the participant on which the process is performed wishes to be able to address or forward messages.

In act 701, the facility determines available routes to a particular destination participant for which the process is being performed. In some embodiments, the facility uses information in the participant table shown in FIG. 3 and/or other data resources to determine the available routes to the destination participant. In act 702, for each of the available routes determined in act 701, the facility accesses energy consumption details for participants that are on that route. In act 703, the facility identifies the available route determined in act 701 whose participants' energy consumption details accessed in act 702 best satisfy one or more participant energy consumption criteria. A variety of participant energy consumption criteria used by the facility in various embodiments, as well as associated energy consumption details, are discussed below. In act 704, the facility stores a direction that messages addressed to the destination participant are to be sent via the route identified in act 703. In various embodiments, the facility stores this direction in the participant table, a separate routing table, or a different routing data resource. After act 704, this process concludes.

In some embodiments, the facility uses a participant energy consumption criterion that chooses the route whose largest distance hop is the shortest. For illustration purposes, FIG. 6 includes physical distances between participants as the distance hop between participants. Instead of using physical distances, the distance of a hop between participants can also be measure in other ways, such as time-of-flight for messages between participants. For example, to determine in participant A a route to participant D, the facility considers the routes ABD, ACD, and ABEFD. In the route ABD, the hop BD is the largest-distance hop (e.g., hop AB has a distance of 270 m and hop BD has a hop of 425 m); in the route ACD, the hop AC is the largest-distance hop (hop AC has a distance of 545 m and hop CD has a distance of 445 m); in the route ABEFD (hop AB has a distance of 270 m, hop BE has a distance of 515 m, the hop EF has a distance of 495 m, and hop FD has a distance of 330 m) is the largest-distance hop of the route. In some embodiments, the facility's analysis is based on the polynomial proportionality of distance to energy usage, in which power level depends on the square of distance for isotropic antennas. Comparing hops AC, BD, and BE, it can be seen that the hop BD has the smallest distance. Accordingly, the route ABD has a longest hop that is shorter than the longest hop of routes ACD and ABEFD; accordingly, the facility stores a direction to route messages from participant A to participant D through the route ABD.

In some embodiments, the facility uses a participant energy consumption criterion that selects the available route that has the fewest hops. Again, using the example of routing from participant A to participant D, routes ACD and ABD each have two hops, while the route ABEFD has four hops. Accordingly, in this example, using this criterion, the facility selects route ACD or ABD.

In some embodiments, the facility uses a participant energy consumption criterion that selects the route having the smallest total distance, from participant to participant. Again using the example of routing from participant A to participant D, it can be seen that the distances between the participants in route ABD add up to only about 60% of route ACD, and only about one-third as much as the distances between participants in route ABEFD. Accordingly, applying this criterion to this example, the facility selects route ABD.

In some embodiments, the facility uses a participant energy consumption criterion that selects the route estimated to require the smallest total energy. In some embodiments, the facility applies this criterion by summing the squares of the distances between participants for each available route. It can be seen that, among available routes ABD, ACD, and ABEFD, this sum is the smallest for route ABD, which the facility selects when applying this criterion to this example.

In some embodiments, the facility applies a participant energy consumption criterion that selects the available route whose contained participant having the lowest amount of stored energy has the highest amount of stored energy. For routing from participant A to participant D, Table 2 below shows the relevant battery charge levels.

TABLE 2

| participant | amount of stored energy |
|---|---|
| B | 275 mAh |
| C | 315 mAh |
| E | 1229 mAh |
| F | 730 mAh |

Because participant A's battery must be used in any route from participant A to participant D, in some cases the facility does not consider participant A's charge level. For route ABD, the facility considers the charge level of participant B, 275 mAh. For route ABEDF, the facility considers the charge levels of participants B, E, and F, the lowest of which is participant B at 275 mAh. For route ACD, the facility considers the charge level of participant C, 315 mAh. Comparing 275 mAh for route ABD, 275 mAh for route ABEFD, and 315 mAh for route ACD, the facility selects route ABD or ABDEF.

In some embodiments, the facility uses a participant energy consumption criterion that selects the route whose participant with the earliest estimated exhaustion time is the latest among the routes. Table 3 below shows the times to exhaustion relevant to this analysis.

TABLE 3

| participant | amount of stored energy | rate of consumption | estimated time to exhaustion |
|---|---|---|---|
| B | 275 mAh | 20 mA | 14 hours |
| C | 315 mAh | 80 mA | 4 hours |
| E | 1229 mAh | 170 mA | 7 hours |
| F | 730 mAh | 50 mA | 15 hours |

For the route ABD, the relevant time to exhaustion is that of participant B, 14 hours. For ACD, the relevant time to exhaustion is that of participant C, four hours. For route ABEFD, the relevant times to exhaustion are those of participants B, E, and F, the smallest of which is the estimated time to exhaustion of participant E, seven hours. Accordingly, among route ABD at 14 hours, route ACD at four hours, and route ABEFD at seven hours, the facility selects route ABD at 14 hours.

In some embodiments, the facility uses a participant energy consumption criterion that excludes routes that pass through participants that have special importance to the network, such as being on a unique path to a valuable resource, including, for example, an Internet connection, or specialized data processing, storage, or sensing resources. In applying this criterion to determining a route from participant A to participant F, the facility considers routes ABDF, ABEF, and ACDF. Because participant D is on the unique route to the Internet, the facility excludes available routes ABDF and ACDF which both include participant B, and selects the remaining route ABEF.

Figure 8:
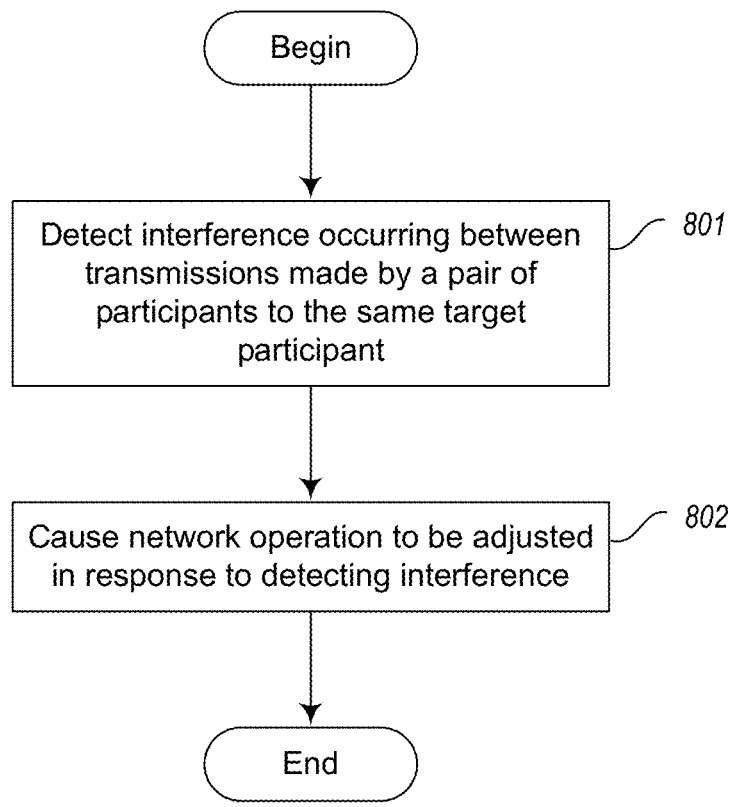
FIG. 8 is a flow diagram showing a process performed by the facility in some embodiments to detect and respond to interference occurring within the network.

FIG. 8 is a flow diagram showing a process performed by the facility in some embodiments to detect and respond to interference occurring within the network. In some embodiments, the facility performs this process in each participant. In act 801, the facility detects interference occurring between transmissions made by a pair of participants to the same target participant. In various embodiments, the facility detects interference in act 801 by observing acknowledgments from the target participant to one or both of the pair of participants requesting retransmission of messages; observing the failure of the target participant to send any acknowledgement to messages from either or both of the pair of participants; where the process is being performed in the target participant, determining that messages sent from either or both of the participants of the pair were not received intact; etc. In act 802, the facility causes the network operation to be adjusted in response to detecting interference in act 801. After act 802, this process concludes. Examples showing the facility performing this process are discussed below in connection with FIG. 9.

Figure 9:
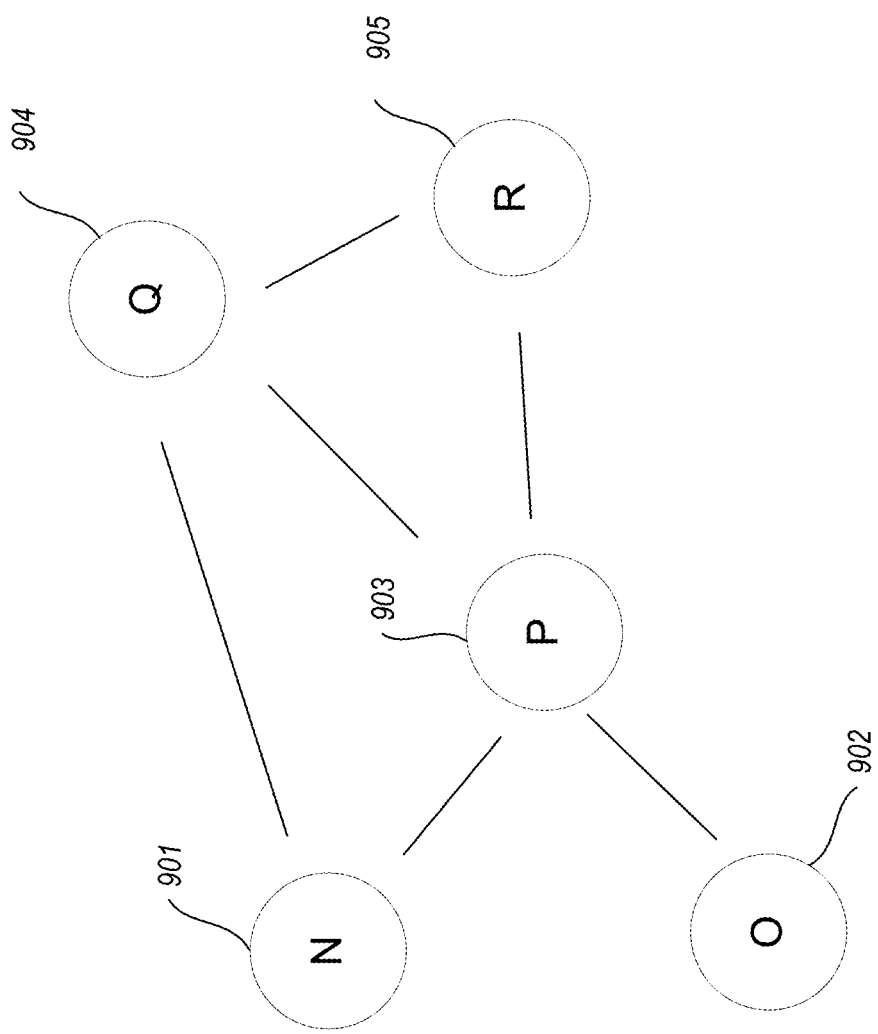
FIG. 9 is a network diagram showing a second configuration of an ad hoc peer wireless network operated by the facility.

FIG. 9 is a network diagram showing a second configuration of an ad hoc peer wireless network operated by the facility. Participant N 901 is directly connected to participant P 903 and participant Q 904. Participant O 902 is directly connected to participant P 903. Participant P 903 is directly connected to participant N 901, participant O 902, participant Q 904, and participant R 905. Participant Q 904 is directly connected to participant N 901, participant P 903, and participant R 905. Participant R 905 is directly connected to participant P 903 and participant Q 904.

In some embodiments, the facility responds to detected interference by reducing the power level at which one or both of the pair of participants transmit to the target participant. As an example, where the facility detects interference between transmissions made to participant P by participants N and O, the facility reduces the power level at which participants N and O transmit to participant P, such as by reducing them each by 20%. In some embodiments, for each of participants N and O, the facility reduces a simple power level used by the participant to all other participants, such as by reducing it by 20%.

In some embodiments, in response to detecting interference, the facility reroutes messages from one of the pair of participants such that they no longer pass through the target participant. As an example, where the facility detects interference occurring between transmissions made to participant P by participants N and O, the facility changes the route used by participant N to reach participant R from route NPR to route NQR. As a result, among participants N and O, only participant O is transmitting to participant P (except where participant P is the ultimate addressee of a message).

Figure 10:
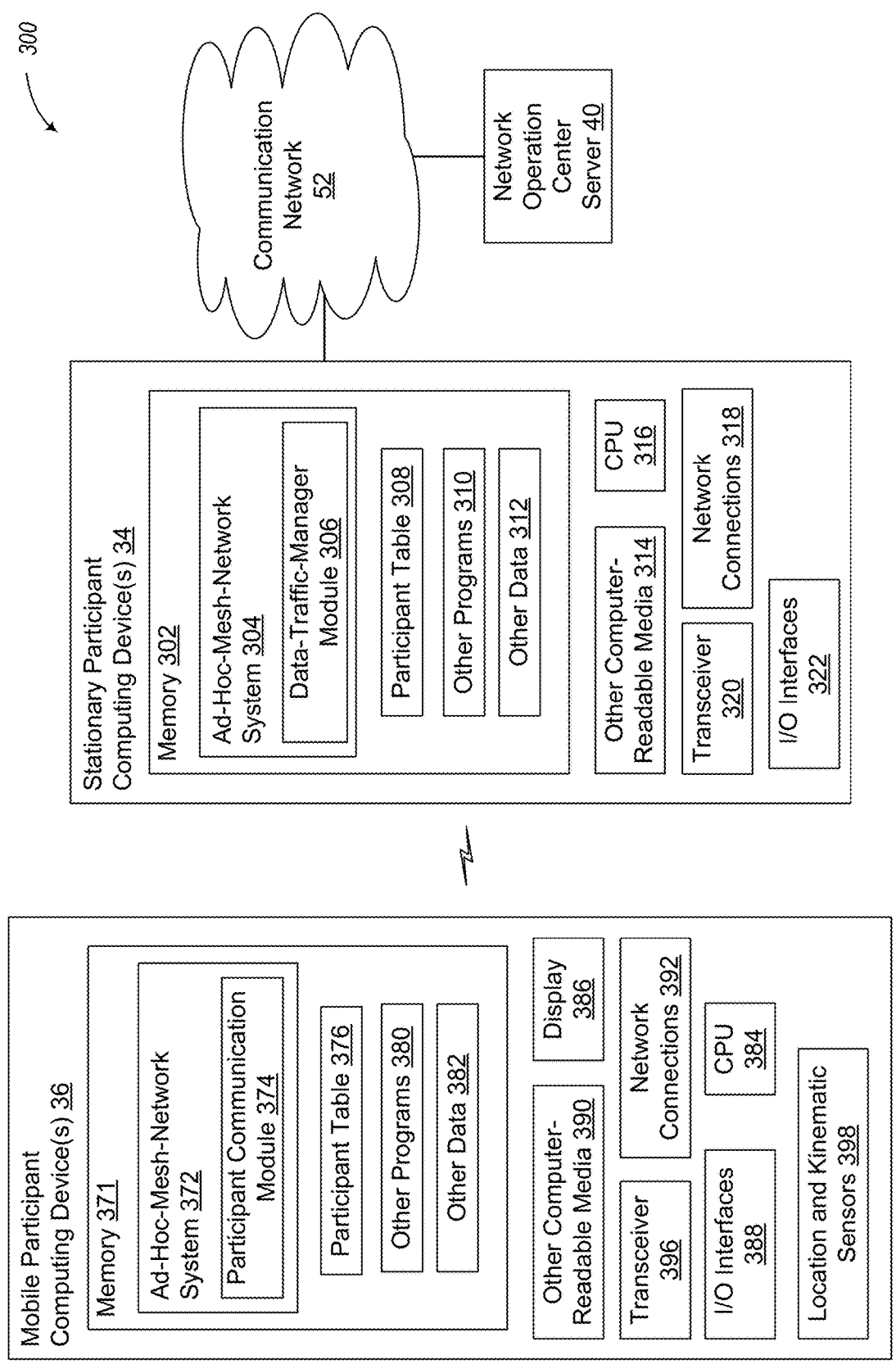
FIG. 10 shows a system diagram that describes one implementation of computing systems for implementing embodiments described herein.

FIG. 10 shows a system diagram that describes one implementation of computing systems for implementing embodiments described herein. System 300 includes mobile participant computing device(s) 36, stationary participant computing device(s) 34, and network operation center server 40.

Mobile participant computing device(s) 36 communicate with one or more other mobile participant computing devices 36 and stationary participant computing devices 34 via line-of-sight communications to transmit data and other communications among the participants. One or more special-purpose computing systems may be used to implement each mobile participant computing device 36. Accordingly, various embodiments described herein may be implemented in software, hardware, firmware, or in some combination thereof. A mobile participant computing device 34 may include memory 371, one or more central processing units (CPUs) 384, display 386, I/O interfaces 388, other computer-readable media 390, network connections 392, transceiver 396, and motion sensors or other sensors 398.

Memory 371 may include one or more various types of non-volatile and/or volatile storage technologies. Examples of memory 371 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 371 may be utilized to store information, including computer-readable instructions that are utilized by CPU 384 to perform actions, including embodiments described herein.

Memory 371 may have stored thereon ad-hoc-mesh-network system 372, which includes participant communication module 374. The participant communication module 374 may employ embodiments described herein to send notification signals, track participants via participant table 376, and to generate and transfer data and communications to other participants.

The memory 371 also stores participant table 376. In various embodiments, this is a local version of the participant table generated by the mobile participant or received from a stationary participant 34 or other mobile participant 36. The participant table 376 may be a partial version or a complete version of the participant table 308 maintained by the stationary participants 34 or by mobile participants if stationary participants are unavailable.

The memory 371 may also store other programs 380 and other data 382. The other programs 380 may include user applications, other tracking or geo-positioning programs, etc. The other data 382 may include data or information regarding one or more non-participant objects or other information.

Network connections 392 are configured to communicate with other computing devices, such as other mobile participant computing devices 36 and stationary participant computing devices 34 via transceiver 396 and line-of-sight communications mechanisms and technologies. Transceiver 396 may be a omni-directional transceiver that sends and receives radio signals independent of direction, or transceiver 396 may be a directional transceiver that sends or receives, or both sends and receives, radio signals to or from a particular direction relative to the positioning of the mobile participant computing device 36.

Location and kinematic sensors 398 include one or more sensors that are used to determine the position of the mobile participant computing device 36 and the kinematic information of how the mobile participant computing device 36 is moving. Examples of location and kinematic data sensors 398 include, but are not limited to using participant's self-reported notifications calibrated off of stationary participants, processing the echo of own self-reported notifications, GPS modules, accelerometers, gyroscopes, or other sensors that can be used to determine the position and kinematic information of the mobile participant computing device 36.

Other I/O interfaces 388 may include a keyboard, audio interfaces, video interfaces, or the like. Other computer-readable media 390 may include other types of stationary or removable computer-readable media, such as removable flash drives, external hard drives, or the like. Display 386 is a display interface that is configured to output images, content, or information to a user. Examples of display 386 include, but are not limited to, LCD screens, LEDs or other lights, or other types of display devices.

Stationary participant computing device(s) 34 communicate with mobile participant computing devices 36 via line-of-sight communications and with other stationary participants either by wired or wireless communications to transmit information or data to other participants or to non-participants. One or more special-purpose computing systems may be used to implement each stationary participant computing device 34. Accordingly, various embodiments described herein may be implemented in software, hardware, firmware, or in some combination thereof. A stationary participant computing device 34 may include memory 302, one or more central processing units (CPUs) 316, I/O interfaces 322, other computer-readable media 314, network connections 318, and transceiver 320.

Memory 302 may include one or more various types of non-volatile and/or volatile storage technologies. Examples of memory 302 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 302 may be utilized to store information, including computer-readable instructions that are utilized by CPU 316 to perform actions, including embodiments described herein.

Memory 302 may have stored thereon ad-hoc-mesh-network system 304, which includes data-traffic-manager module 306. The data-traffic-manager module 306 may employ embodiments described herein to transfer data from one participant to another participant and to manage and provide participant table updates. In various embodiments, data-traffic-manager module 306 may communicate with network operation center server 40 via communication network 52, such as to provide or receive participant table updates.

The memory 302 may also store participant table 308, other programs 310, and other data 312. The participant table 308 may be a full version of the participant table 308 or it may be a partial version based on those mobile participants 36 within line-of-sight of or a threshold number of hops from the stationary participant 34. The other data 312 may include data or information regarding one or more tracked objects or other information.

Network connections 318 are configured to communicate with other computing devices, such as other stationary participant computing devices 34 and mobile participant computing devices 36 via transceiver 320 and wired or line-of-sight communications mechanisms and technologies. Network connections 318 are also configured to communicate with the network operation center server 40 via communication network 52.

Transceiver 320 may be a omni-directional transceiver that sends and receives radio signals independent of direction, or transceiver 320 may be a directional transceiver that sends or receives, or both sends and receives, radio signals to or from a particular direction relative to the position of the stationary participant computing device 34.

Other I/O interfaces 322 may include a keyboard, audio interfaces, video interfaces, or the like. Other computer-readable media 314 may include other types of stationary or removable computer-readable media, such as removable flash drives, external hard drives, or the like.

Network operation center server 40 includes one or more computing devices that store information about the positioning of mobile participant computing devices 36 and stationary participant computing devices 34, such as a master participant table. The network operation center server 40 may also store information regarding the positioning and movement of non-participant objects that are reported to it by the mobile participant computing devices 36 or the stationary participant computing devices 34. The network operation center server 40 also includes memory, one or more processors, network interfaces and connections, and other computing components similar to mobile participant computing devices 36 and stationary participant computing devices 34, but those components are not shown here for ease of illustration.

Communication network 52 may include one or more wired or wireless communication networks to transmit data between one stationary participant computing device 34 and another stationary participant computing device 34 or with the network operation center server 40.

Figure 11:
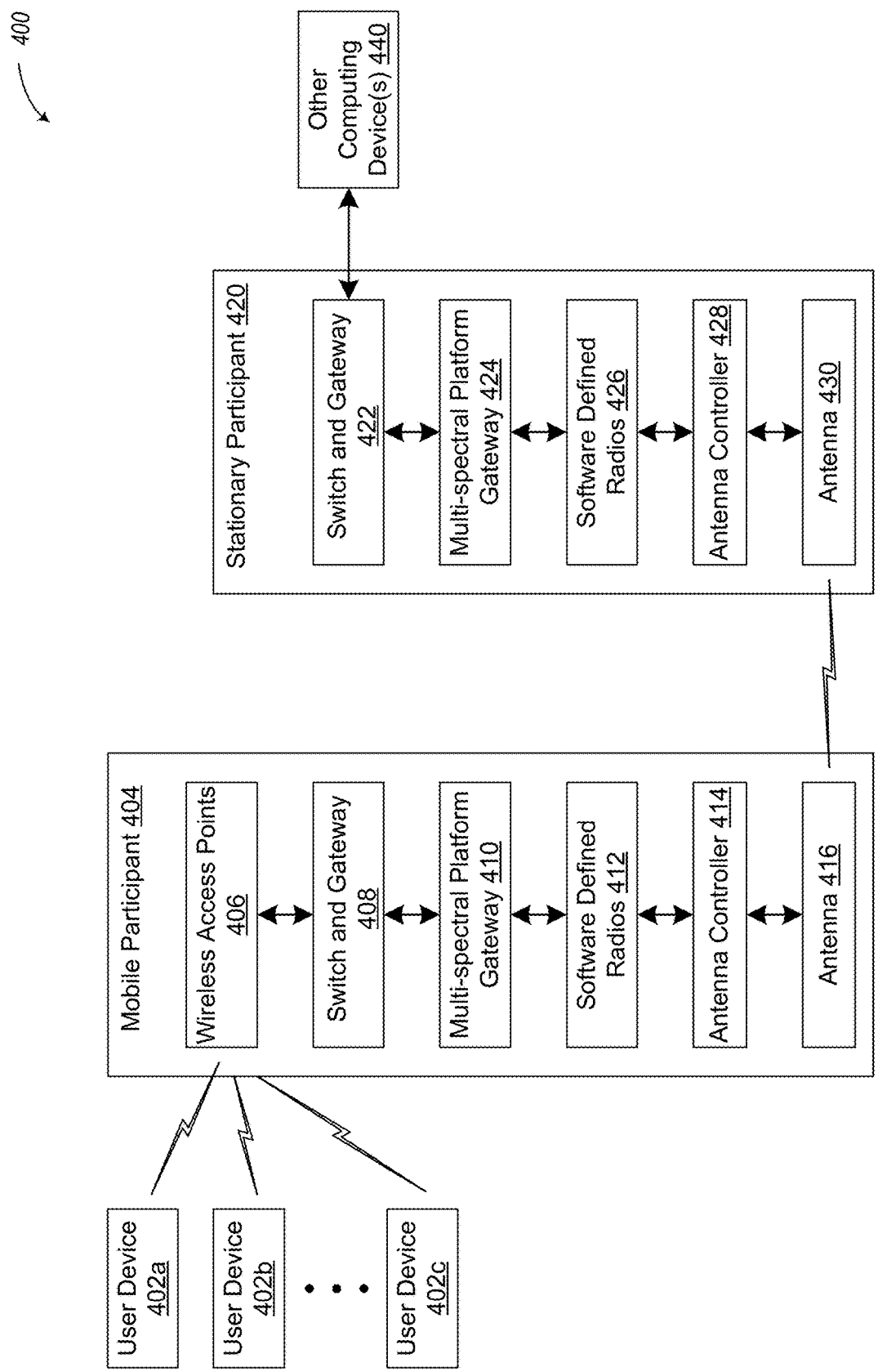
FIG. 11 shows a system diagram that describes another implementation of computing systems for implementing embodiments described herein.

FIG. 11 shows a system diagram that describes another implementation of computing systems for implementing embodiments described herein. System 400 includes user devices 402a-402c that are in wireless line-of-sight communication with mobile participant 404, which is in wireless line-of-sight communication with stationary participant 420, which is in wired communication with other computing device 440. As described above, user devices 402a-402c may be tier 1 mobile participants in communication with a tier 3 mobile participant or some other mobile participant. Mobile participant 404 may be an embodiment of a mobile participant 32 and stationary participant 420 may be an embodiment of a stationary participant 34 discussed above.

Mobile participant 404 includes one or more wireless access points 406 to communicate with user devices 402a-402c. Switch and gateway 408 coordinates and handles communications between the wireless access points 406 and a multi-spectral platform gateway 410. The multi-spectral platform gateway 410 performs embodiments described herein to update the participant table and to select an optimum route, spectrum and antenna to transmit communications from the mobile participant 404. The multi-spectral platform gateway 410 also selects many transmission characteristics based on information in the participant table and provides them to one or more software defined radios 412. The software defined radios 412 select the frequency from the multi-spectral platform gateway selected spectrum at which to transmit communication from the mobile participant 404. The antenna controller 414 form and steer a transmission beam via antenna 416 based on the selected transmission information, the selected frequency, and the multi-spectral platform gateway provided location of intended recipient. This transmission may be directed to another mobile participant 404, another type of mobile participant, or to the stationary participant 420.

In some embodiments, the mobile participant 404 may store or cache a threshold amount of data received from or provided to the user devices 402a-402c. The data may be cached for a threshold amount of time or storage space. In this way, if a user device subsequently requests the same data that was already obtained for another user device, such as a movie or other in-flight entertainment, then the mobile participant 404 can provide the cached data to the user device without having to transmit additional communications to other participants to obtain the data. In some embodiments, forwarding participants may also cache data for a predetermined amount of time, which can act as a backup incase the forwarded communication was not successfully received or if the forwarding participant has to select another route to transmit the communication. In yet other embodiments, the cached data can be used to answer a request from another participant so that they do not have to request the information from a stationary participant, which can alleviate wasted network usage by transferring data that has already been transferred from the internet or other source previously.

Stationary participant 420 receives the transmission from the mobile participant 404 at an antenna controller 428 via antenna 430 and provides the received signals to a software defined radio 426. The software defined radio 426 provides the received communications to a multi-spectral platform gateway 424, which determines whether the communication should be transmitted to a next participant, such as another mobile participant 404, some other mobile participant, or to another stationary participant 420 via a wired network, or whether the communication is to be provided to other computing devices 440. If the communication is to be transmitted to another mobile participant or another mobile participant via line-of-sight communications, then the stationary participant 420 utilizes the multi-spectral platform gateway 424, the software defined radios 426, the antenna controller 428, and the antenna 430 in a manner similar to mobile participant 404 to directionally transmit the communication to a next participant. If the communication is destined for some other non-participant computing device, then the multi-spectral platform gateway 424 provides the communication to switch and gateway 422 for transmission via a wired communication network to other computing devices 440.

If the communication was for data or information from the other computing devices 440, then the other computing devices 440 may answer a request and return data or information to the stationary participant 420 for transmission to the mobile participant 404 and then to the requesting user device in a somewhat reverse fashion than what is described above.

One non-limiting non-exhaustive example of components utilized by the mobile participant 404 may include, but is not limited to: a conformal and non-conformal electronically steered antenna array, cabling appropriate for array and radio communication, cognitive radio suites that both receive and transmit in pairs suitable to service the entirety of the participant max capacity, cabling appropriate for radio to host platform communication, cabling from host platform to server and in-flight entertainment suite, onboard server with up to 10 TB of storage, onboard cognitive modems and routers with public address capability, cognitive equipment power supplies, cognitive radio transmission amplifier and power supply, and onboard firewall.

One non-limiting non-exhaustive example of components utilized by the mobile participant 404 may include, but is not limited to: an adaptive power backup generator, cognitive multi-spectral antennas×6, 42U rack, rack mounted server, integrated processor chip, SSL & VPN appliance, external firewall appliance, internal firewall appliance, load management appliance, web filter appliance, multi-spectral cognitive Radio×4, High throughput router, smart power strip/UPS, mesh network Wi-Fi appliances, small mesh network home appliances, wireless access points with public address appliances, and backhaul connectivity.

In various embodiments, communications between participants may include one or multi-level security. For example, in some embodiments, all transmission via the participant network may employ a first encryption or security mechanism. Some communications between participants may further include another layer of security. For example, a user may have a cell phone and a home network. The cell phone may be a mobile participant and a router on the home network may be a participant access node. The home network may be protected by Wired Equivalent Privacy (WEP), Wi-Fi Protected Access (WPA), Wi-FI Protected Access II (WPA2), or other security mechanism. In this example, the cell phone participant may first encrypt communications via the same security mechanism as the home network and then encrypt the communications using the network encryption. The cell phone participant employs embodiments described herein to route the encrypted communications to the router participant, which can decrypt the communication using the network encryption mechanism and then the home network security mechanism. Even additional layers of encryption and security can be employed for a group of users or devices, subsets of users in the group, individuals in those subsets, etc.

The various embodiments described above can be combined to provide further embodiments. These and other changes can be made to the embodiments in light of the above-detailed description. Moreover, additional details and use case examples are provided in the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 15/892,259, filed Feb. 8, 2018, entitled "Object Tracking Using A Cognitive Heterogeneous Ad Hoc Mesh Network" and Provisional Patent Application No. 62/467,572, filed Mar. 6, 2017, entitled "Scatternet: A cognitive heterogeneous ad hoc mesh data/cellular/Wi-Fi network establishment/access points/connected devices through utilization of software applications exploiting existing technologies and frequency spectrum for data and voice communications through the exploitation of the Internet and Internet of Things, resulting in the creation of Data communications Adaptive RADAR (DATAR)," are incorporated herein by reference, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a first participant in a wireless peer network having other participants including a second participant, the method comprising:
   at a first time at which a distinguished power level is set to a first value, transmitting a first message to the second participant at the first value of the distinguished power level;
   receiving an indication that the first message was successfully received;
   in response to receiving the indication, setting the distinguished power level to a second value that is less than the first value with a difference between the first value and the second value being smaller than a difference between a third value set prior to the first time and the first value; and
   at a second time at which the distinguished power level is set to the second value, transmitting a second message to the second participant at the second value of the distinguished power level.

2. The method of claim 1, further comprising:
   at a time at which the distinguished power level is set to the second value, transmitting a third message to a third participant at a power level that is different from the second value.

3. The method of claim 1, further comprising:
   at a time at which the distinguished power level is set to the second value, transmitting a third message to a third participant at the second value of the distinguished power level.

4. The method of claim 1, further comprising:
   at a third time before the first time, the distinguished power level being set to the third value less than the first value at the third time, transmitting a third message to the second participant;
   for a period of time following the third time, not receiving an indication that the third message was successfully received;
   in response to not receiving an indication that the third message was successfully received during the period of time, setting the distinguished power level to the first value.

5. The method of claim 1, further comprising:
   determining a distance between the first and second participants;
   based upon the determined distance, estimating a minimum power level needed to successfully transmit messages from the first participant to the second participant; and
   selecting the second value based upon the estimated minimum power level.

6. The method of claim 5, where the selecting selects the second value to be equal to the estimated minimum power level.

7. The method of claim 1, further comprising:
   receiving an indication that the second message was successfully received;
   in response to receiving the indication that the second message was successfully received, setting the distinguished power level to a third value that is less than the second value; and
   at a third time at which the distinguished power level is set to the third value, transmitting a third message to the second participant at the third value of the distinguished power level.

8. The method of claim 1, further comprising:
   selecting a distinguished participant as the first participant in response to determining that the distinguished participant is a necessary part of a route to a distinguished network resource.

9. A computing device, comprising:
   a transceiver configured to send and receive data;
   a memory that stores computer instructions; and
   at least one processor that, when executing the computer instructions, cause the computing device to:
      set a transmit power of the computing device to a first power level;
      wirelessly transmit a first message at a first time to a second computing device via the transceiver using the transmit power at the first power level;
      in response to receiving an indication that the first message was successfully received by the second computing device, adjust the transmit power to a second power level that is lower than the first power level, including:
         determine a distance between the computing device and the second computing device;
         estimate a minimum power level needed to successfully transmit messages from the computing device to the second computing device based upon the determined distance; and
         select the second power level based upon the estimated minimum power level;
      in response to failing to receive the indication that the first message was successfully received by the second computing device, adjust the transmit power to a third power level that is higher than the first power level; and
      wirelessly transmit a second message at a second time after the first time to the second computing device via the transceiver using the adjusted transmit power.

10. The computing device of claim 9, wherein the at least one processor, when executing the computer instructions, further causes the computing device to:
   at a time at which the transmit power is adjusted to the second power level, wirelessly transmit a third message to a third computing device at a power level that is different from the second power level.

11. The computing device of claim 9, wherein the at least one processor, when executing the computer instructions, further causes the computing device to:

at a time at which the transmit power is adjusted to the second power level, wirelessly transmit a third message to a third computing device at the second power level.

12. The computing device of claim 9, wherein the at least one processor, when executing the computer instructions, further causes the computing device to:

at a third time before the first time, set the transmit power to a third power level less than the first power level at the third time, wirelessly transmit a third message to the second computing device at the third power level;

for a period of time following the third time, fail to receive an indication that the third message was successfully received by the second computing device;

in response to failing to receive the indication that the third message was successfully received by the second computing device during the period of time, set the transmit power to the first power level; and select the second power level such that a difference between the first power level and the second power level is smaller than a difference between the third power level and the first power level.

13. The computing device of claim 9, wherein the at least one processor, when executing the computer instructions to select the second value, further causes the computing device to:

select the second power level to be equal to the estimated minimum power level.

14. The computing device of claim 9, wherein the at least one processor, when executing the computer instructions, further causes the computing device to:

receive an indication that the second message was successfully received by the second computing device;

in response to receiving the indication that the second message was successfully received by the second computing device, set the transmit power to a fourth power level that is less than the third power level; and at a third time at which the transmit power is set to the fourth power level, wirelessly transmit a third message to the second computing device at the fourth power level.

15. A non-transitory processor-readable storage medium that stores computer instructions that, when executed by a processor of a first participant in a wireless peer network, cause the processor to perform actions, the actions comprising:

at a first time at which a distinguished power level is set to a first value, transmitting a first message to a second participant at the first value of the distinguished power level;

in response to not receiving an indication that the first message was successfully received during a period of time following the first time, setting a distinguished power level to a second value that is greater than the first value;

at a second time after the period of time at which the distinguished power level is set to the second value, transmitting a second message to the second participant at the second value of the distinguished power level;

receiving an indication that the second message was successfully received;

in response to receiving the indication, setting the distinguished power level to a third value such that a difference between the second value and the third value is smaller than a difference between the first value and the second value; and at a third time at which the distinguished power level is set to the third value, transmitting a third message to the third participant at the third value of the distinguished power level.

* * * * *